US012668542B2

(12) United States Patent
Fini et al.

(10) Patent No.: US 12,668,542 B2
(45) Date of Patent: Jun. 30, 2026

(54) AIR-BLOWN BITUMEN USING GRAFTED SILICA

(71) Applicants: Elham Fini, Phoenix, AZ (US); Saba Shariati, Shenzhen (CN)

(72) Inventors: Elham Fini, Phoenix, AZ (US); Saba Shariati, Shenzhen (CN)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 560 days.

(21) Appl. No.: 18/153,143

(22) Filed: Jan. 11, 2023

(65) Prior Publication Data

US 2023/0219846 A1 Jul. 13, 2023

Related U.S. Application Data

(60) Provisional application No. 63/298,441, filed on Jan. 11, 2022.

(51) Int. Cl.

*C04B 20/10* (2006.01)
*C04B 14/06* (2006.01)
*C04B 26/26* (2006.01)
*C04B 103/00* (2006.01)

(52) U.S. Cl.

CPC ............ *C04B 20/107* (2013.01); *C04B 14/06* (2013.01); *C04B 26/26* (2013.01); *C04B 2103/0078* (2013.01)

(58) Field of Classification Search

CPC ....... C04B 20/107; C04B 14/06; C04B 26/26; C04B 2103/0078; C04B 2111/00017; C04B 20/008; C04B 24/003; C04B 24/123; C08L 2555/30; C08L 2555/50; C08L 2555/80; C08L 95/00

See application file for complete search history.

(56) References Cited

U.S. PATENT DOCUMENTS

| | | | | |
|---|---|---|---|---|
| 2007/0227351 | A1 | 10/2007 | Garcia-Martinez | |
| 2017/0030077 | A1 | 2/2017 | Wang | |
| 2018/0155629 | A1 * | 6/2018 | Vincent ................ | C09D 103/04 |
| 2021/0309858 | A1 | 10/2021 | Seo et al. | |

OTHER PUBLICATIONS

Application of surface modified silica nano particles with dual silane coupling agents in bitumen for performance enhancement Sidharth Reddy Karnati Daniel Oldham Elham H Fini Lifeng Zhang Construction and building Materials 244 (2020) 118324 (Year: 2020).*

Multiscale Evaluation of Syngergistic and Antagonistic Interaction between Bitumen Modifiers by Masoumeh Mousavi Daniel J Oldham Shahrzad Hosseinnezhad and Elham H Fini ACS Sustainable Chem Eng (2019) 7, 15568-15577 (Year: 2019).*

(Continued)

*Primary Examiner* — Pamela H Weiss

(74) *Attorney, Agent, or Firm* — Fish & Richardson P.C.

(57) ABSTRACT

A modified bitumen composition includes bitumen and a multiplicity of silica particles. Each silica particle is coupled to an acid component. Treating a modified bitumen includes contacting the modified bitumen with a flow of air and removing the flow of air after a length of time when a penetration grade of the bitumen decreases to a specified value.

8 Claims, 18 Drawing Sheets

(56) References Cited

OTHER PUBLICATIONS

Enhancing Economic and Environmental Sustainability of the Manufacturing Process for Air Blow Bitumen Pouria Hajikarimi Saba Shariati Mohammad Rahi Ruhollah Kazemi Fereidoon Moghadas Nejad Elham H Fini Journal of Cleaner Production 323 (2021) 128978 (Year: 2021).*
Moschopedis, S. E.; Speight, J. G., The effect of air blowing on the properties and constitution of a natural bitumen. Journal of Materials Science 1977, 12 (5), 990-998.
Petersen, J. C.; Glaser, R., Asphalt Oxidation Mechanisms and the Role of Oxidation Products on Age Hardening Revisited. Road Materials and Pavement Design 2011, 12 (4), 795-819.
Baumgardner, G. L.; Masson, J. F.; Hardee, J.; Menapace, A. M.; Williams, A. G.; Kluttz, R.; Dunning, R.; Scherocman, J.; Puzinauskas, V.; Reinke, G.; Martin, J. V.; Arnold, T.; Kennepohl, G., Polyphosphoric acid modified asphalt: Proposed mechanisms. Asphalt Paving Technology: Association of Asphalt Paving Technologists—Proceedings of the Technical Sessions 2005, 74, 283-305.
Blum, P.; Sagner, A.; Tiehm, A.; Martus, P.; Wendel, T.; Grathwohl, P., Importance of heterocylic aromatic compounds in monitored natural attenuation for coal tar contaminated aquifers: A review. Journal of Contaminant Hydrology 2011, 126 (3), 181-194.
Boczkaj, G.; Kamiński, M., Research on the separation properties of empty-column gas chromatography (EC-GC) and conditions for simulated distillation (SIMDIS). Analytical and Bioanalytical Chemistry 2013, 405 (25), 8377-8382.
Clark, S. J.; Segall, M.; Pickard, C.; Hasnip, P.; Probert, M.; Refson, K.; Payne, M. C., First principles methods using CASTEP. Zeitschrift für Kristallographie-Crystalline Materials 2005, 220, 567-570.
Corbett, L. W., Reaction Variables in the Air Blowing of Asphalt. Industrial & Engineering Chemistry Process Design and Development 1975, 14, 181-187.
Davie, F. M.; Mores, S.; Nolan, P. F.; Hoban, T. W. S., Evidence of the oxidation of deposits in heated bitumen storage tanks. Journal of Loss Prevention in the Process Industries 1993, 6 (3), 145-150.
Delley, B., From Molecules to Solids With the DMol3 Approach. The Journal of Chemical Physics 2000, 113, 7756-7764.
Department of Health and Human Services, Health Effects of Occupational Exposure to Asphalt. NIOSH Publication No. 2001-110, 2000, 150 pages.
Deygout, F., Volatile emissions from hot bitumen storage tanks. Environmental Progress & Sustainable Energy 2011, 30 (1), 102-112.
Fini, E.; Hajikarimi, P.; Rahi, M.; Moghadas Nejad, F., Physiochemical, Rheological, and Oxidative Aging Characteristics of Asphalt Binder in the Presence of Mesoporous Silica Nanoparticles. Journal of Materials in Civil Engineering 2016, 28, 04015133, 9 pages.
Fujiki, J.; Furuya, E., Density functional theory study of adsorption of benzothiophene and naphthalene on silica gel. Fuel 2016, 164, 180-185.
Ghanoon, S. A.; Tanzadeh, J., Laboratory evaluation of nano-silica modification on rutting resistance of asphalt Binder. Construction and Building Materials 2019, vol. 223, 1074-1082.
Grimme, S., Density functional theory with London dispersion correction. Wiley Interdisciplinary Reviews: Computational Molecular Science 2011, 1, 211-228.
Hajikarimi, P.; Shariati, S.; Rahi, M.; Kazemi, R.; Nejad, F. M.; Fini, E. H., Enhancing the Economics and Environmental Sustainability of the Manufacturing Process for Air-Blown bitumen. Journal of Cleaner Production 2021, 323, 128978, 9 pages.
Hidalgo, K.; Sierra Garcia, I.; Dellagnezze, B.; Oliveira, V., Metagenomic Insights Into the Mechanisms for Biodegradation of Polycyclic Aromatic Hydrocarbons in the Oil Supply Chain. Frontiers in Microbiology 2020, 11, 561506, 20 pages.
Hung, A. M.; Fini, E. H., Absorption spectroscopy to determine the extent and mechanisms of aging in bitumen and asphaltenes. Fuel 2019, 242, 408-415.
International Agency for Research on cancer (IARC), IARC Monographs on the Evaluation of carcinogenic risks to Humans: Overall evaluations of Carcinogenicity, An Updating of IARC Monographs. 1-42 (Lyon), 1987.
Kabir, S. F.; Mousavi, M.; M. Hung, A.; H. Fini, E., High-sulfur bitumen amplifies the effect of polyphosphoric acid. Fuel 2022, 314, 123128, 10 pages.
Karnati, S. R.; Oldham, D.; Fini, E.; Zhang, L., Application of surface-modified silica nanoparticles with dual silane coupling agents in bitumen for performance enhancement. Construction and Building Materials 2020, 244, 118324, 9 pages.
Khare, P., Asphalt-related emissions are a major missing source of secondary organic aerosol precursors. Science Advances 2020, 6. eabb9785, 15 pages.
Lemarchand, C. A.; Schrøder, T. B.; Dyre, J. C.; Hansen, J. S., Cooee bitumen: Chemical aging. The Journal of Chemical Physics 2013, 139 (12), 124506, 36 pages.
Li, D. D.; Greenfield, M. L., Chemical compositions of improved model asphalt systems for molecular simulations. Fuel 2014, 115, 347-356.
Maghsoodlou, M.; Mostafa, S.; Khorassani, H.; Heydari, R.; Hazeri, N.; Sajadikhah, S. S.; Rostamizadeh, M.; Keishams, L., Silica supported polyphosphoric acid (PPA-SiO2): An efficient and reusable heterogeneous catalyst for the one-pot synthesis of α-amino phosphonates. Turkish Journal of Chemistry 2010, 34, 565-570.
Mahmudov, K. T.; Guedes da Silva, M. F. C.; Zubkov, F. I.; Pombeiro, A. J. L., Noncovalent Interactions in Alkane Chemistry. In Alkane Functionalization, 2019; pp. 539-555.
Masson, J. F., Brief Review of the Chemistry of Polyphosphoric Acid (PPA) and Bitumen. Energy & Fuels 2008, 22 (4), 2637-2640.
Masson, J. F.; Gagné, M., Polyphosphoric Acid (PPA)-Modified Bitumen: Disruption of the Asphaltenes Network Based on the Reaction of Nonbasic Nitrogen with PPA. Energy & Fuels 2008, 22 (5), 3402-3406.
National Asphalt Pavement Association (NAPA), Asphalt Pavement Industry Goals for Climate Stewardship: Toward Net Zero Carbon Emissions. https://www.asphaltpavement.org/climate/industry-goals. Jul. 10, 2022, 4 pages.
Oldham, D.; Qu, X.; Wang, H.; Fini, E., Investigating Change of Polydispersity and Rheology of Crude Oil and Bitumen Due to Asphaltene Oxidation. Energy & Fuels 2020, 314, 10299-10305.
Payne, M. C.; Teter, M. P.; Allan, D. C.; Arias, T. A.; Joannopoulos, J. D., Iterative minimization techniques for ab initio total-energy calculations: molecular dynamics and conjugate gradients. Reviews of Modern Physics; 1992, 64 (4):1045-1098.
Perdew, J. P.; Burke, K.; Ernzerhof, M., Generalized Gradient Approximation Made Simple. Phys Rev Lett 1996, 77 (18), 3865-3868.
Petersen, J. C.; Harnsberger, P. M., Asphalt Aging: Dual Oxidation Mechanism and Its Interrelationships with Asphalt Composition and Oxidative Age Hardening. Transportation Research Record 1998, 1638 (1), 47-55.
Rajib, A. I.; Shariati, S.; Fini, E. H., The effect of progressive aging on the bond strength of bitumen to siliceous stones. Applied Surface Science 2021, 550, 149324, 9 pages.
Samieadel, A.; Fini, E. H., Interplay between wax and polyphosphoric acid and its effect on bitumen thermomechanical properties. Construction and Building Materials 2020, 243, 118194, 14 pages.
Sarkhel, S.; Rich, A.; Egli, M., Water-Nucleobase “Stacking”: H-π and Lone Pair-π Interactions in the Atomic Resolution Crystal Structure of an RNA Pseudoknot. Journal of the American Chemical Society 2003, 125 (30), 8998-8999.
Shariati, S.; Mousavi, M.; Hung, A.; Fini, E. H., Interaction mechanisms of polyphosphoric acid and nano clay in bituminous composites. Journal of Colloid and Interface Science 2021, 588, 446-455.
Soenen, H.; Heyrman, S.; Lu, X.; Redelius, P.; Edwards, J. C. In The Interaction of Polyphosphoric Acid with Bituminous Binders, 8th RILEM International Symposium on Testing and Characterization of Sustainable and Innovative Bituminous Materials, Dordrecht, 2016; Canestrari, F.; Partl, M. N., Eds. Springer Netherlands: Dordrecht, 2016; pp. 103-114.

(56) References Cited

OTHER PUBLICATIONS

Swartz, C. D.; King, L. C.; Nesnow, S.; Umbach, D. M.; Kumar, S.; DeMarini, D. M., Mutagenicity, stable DNA adducts, and abasic sites induced in *Salmonella* by phenanthro[3,4-b]- and phenanthro[4,3-b]thiophenes, sulfur analogs of benzo[c]phenanthrene. Mutation Research/Fundamental and Molecular Mechanisms of Mutagenesis 2009, 661 (1), 47-56.

Vassiliev, N.; Davison, R.; Williamson, S.; Glover, C., Air Blowing of Supercritical Asphalt Fractions. Industrial & Engineering Chemistry Research—Ind Eng Chem Res 2001, 40, 1773-1780.

Vekariya, R. H.; Prajapati, N. P.; Patel, H. D., Silica-supported polyphosphoric acid (PPA-SiO2): An efficient and reusable heterogeneous catalyst for ecofriendly organic synthesis. Synthetic Communications 2016, 46 (3), 197-219.

* cited by examiner

AIR-BLOWN BITUMEN USING GRAFTED SILICA

CROSS-REFERENCE TO RELATED APPLICATION

This application claims the benefit of U.S. Patent Application 63/298,441 filed on Jan. 11, 2022, which is incorporated herein by reference in its entirety.

STATEMENT OF GOVERNMENT SUPPORT

This invention was made with government support under 1928807 awarded by the National Science Foundation. The government has certain rights in the invention.

TECHNICAL FIELD

This invention relates to platform technology to produce air-blown bitumen and reduce the emission of hazardous organic volatiles to air from petroleum-based products.

BACKGROUND

Crude oil is separated into its components in refinery distillation towers based on differences in component boiling points. In the initial distillation process (distillation at ambient pressure), some heavy material remains at the bottom of the tower. This heavy material is transferred to a vacuum distillation unit and its various components are separated by vacuum distillation. The remainder of this vacuum distillation process, which is known as vacuum bottom (VB), is used to produce bitumen. To produce air-blown bitumen, the VB is aerated in the bitumen production unit (e.g., bitumen production tower). The passage of air through the VB also causes an oxidation process to occur, which improves residual properties of the VB (e.g., increases stiffness). The mechanism of air blowing mainly relies on the oxidation of light compounds of VB via heated air, which in turn increases the polarity of molecules. An increase in polarity increases self-assembly and polydispersity interactions between molecules in VB that lead to increases in VB's stiffness.

SUMMARY

This disclosure describes air-blown bitumen made by combining acid-modified particles to bitumen (e.g., vacuum bottom (VB)). In one example, the acid-modified particles include polyphosphoric acid (PPA)-grafted silica. The PPA-grafted silica imparts enhanced performance grading to the air-blown bitumen, resulting in better resistance to creep and permanent deformation under load. Advantages of the methods and compositions described herein include reduction of production time, energy consumed in the process, and associated emissions, as well as enhanced quality of the resulting graded bitumen.

In a first general aspect, a modified bitumen composition includes bitumen and a multiplicity of silica particles. Each silica particle is coupled to an acid component.

Implementation of the first general aspect can include one or more of the following features.

The acid component can include 3-aminopropyl triethoxysilane (APTES), 3-glycidyloxypropyl trimethoxysilane, polyphosphoric acid, or a combination thereof. In some cases, the acid component includes polyphosphoric acid. In some implementations, the silica particles are nanoparticles.

The nanoparticles can have a diameter in a range of about 10 nm to about 50 nm. In some cases, the first general aspect includes about 90 wt % to about 97 wt % of the bitumen, about 2 wt % to about 6 wt % of the silica particles, and about 0.2 wt % to about 2 wt % of the acid component. In some implementations, the modified bitumen is an air-blown bitumen. A building material can include the modified bitumen of the first general aspect. In some cases, an asphalt can include the modified bitumen of the first general aspect.

In a second general aspect, treating a modified bitumen includes contacting the modified bitumen with a flow of air, and removing the flow of air after a length of time when a penetration grade of the bitumen decreases to a specified value. A temperature of the air can be in a range between 150° C. and 300° C.

Implementation of the second general aspect can include one or more of the following features.

The length of time can be between 1 hour and 10 hours. In some cases, the specified value is 50 or 100. In some implementations, the acid component enhances intermolecular interactions in the bitumen. The acid component can include 3-aminopropyl triethoxysilane (APTES), 3-glycidyloxypropyl trimethoxysilane, polyphosphoric acid, or a combination thereof. In some cases, the acid component includes polyphosphoric acid. In some implementations, the silica particles are nanoparticles. The nanoparticles can have a diameter in a range of about 10 nm to about 50 nm. In some cases, the second general aspect includes about 90 wt % to about 97 wt % of the bitumen, about 2 wt % to about 6 wt % of the silica particles, and about 0.2 wt % to about 2 wt % of the acid component. In some implementations, the modified bitumen is air-blown bitumen. The length of time can be shorter for the modified bitumen than for the bitumen before modification.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

Figure 1:
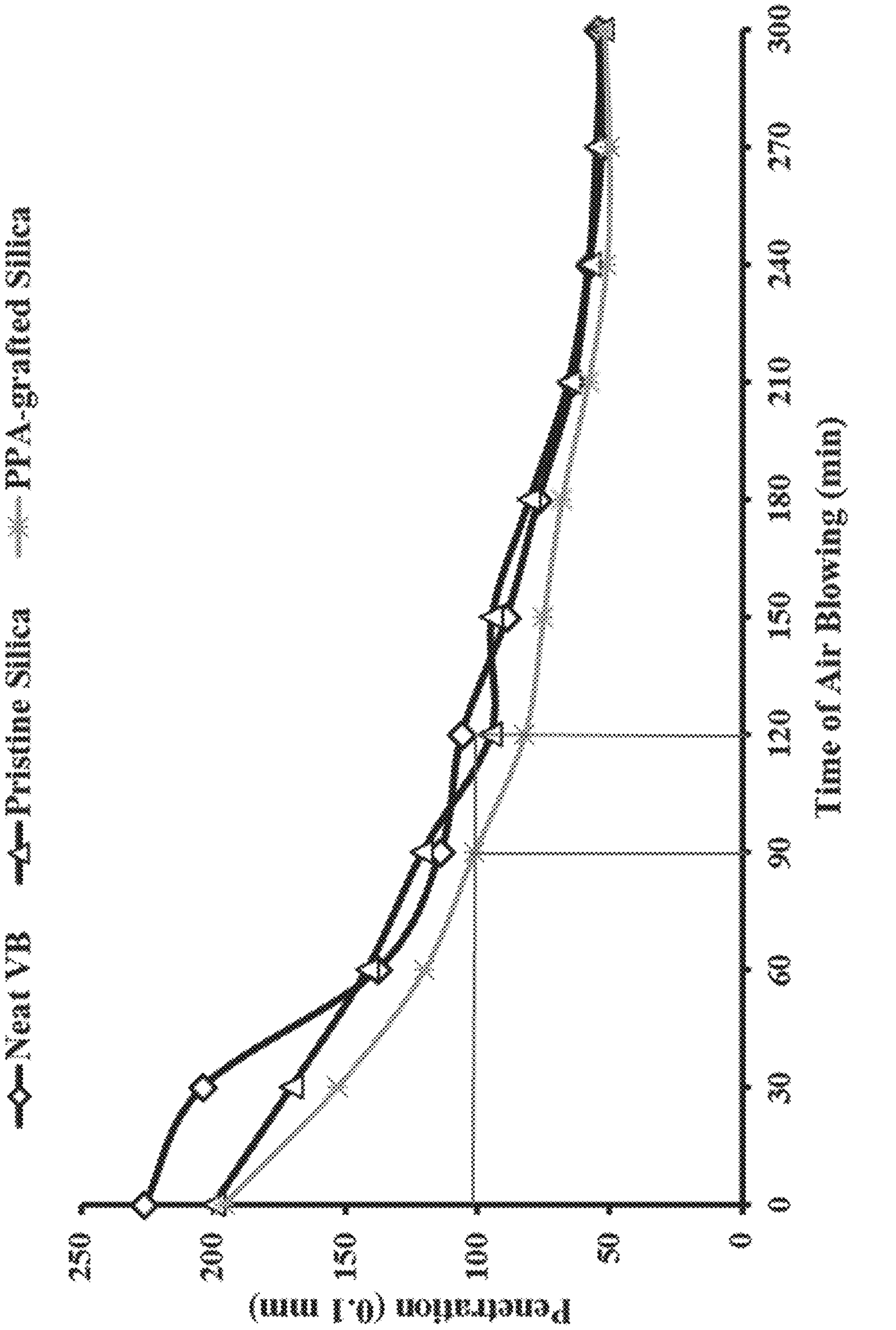
FIG. 1 shows a plot of penetration versus time of the air-blowing process for neat vacuum bottom (VB) and for VB modified with pristine silica and polyphosphoric acid (PPA)-grafted silica.

Modified bitumen compositions described in this disclosure include bitumen and a multiplicity of silica particles. An acid component is grafted to each silica particle. As used herein, "grafted" generally refers to "coupled" (e.g., adsorbed on the surface of the silica particle.) "Adsorbed" includes physically adsorbed, chemically adsorbed, or both. Examples of forces present in physical adsorption include electrostatic forces and van der Waals forces. One example of chemical adsorption is covalent bonding. The modified bitumen shows synergistic effects of the silica and the acid component. These synergistic effects reduce the time and energy typically needed to produce air-blown bitumen at least in part because the introduction of acid-coupled silica accelerates the stiffening of vacuum bottom (VB) via internal structuring induced by air blowing. This in turn reduces the manufacturing time and associated cost and environmental impact of the air-blowing process while enhancing the durability of the resulting air-blown bitumen by decreasing the extent of aging. Building material and asphalt can include the modified bitumen and have advantageous properties compared to those including unmodified bitumen.

Methods are described herein to produce and analyze modified bitumen treated with the air blowing process. The air-blown modified bitumen samples were collected at specified air-blowing times, and their properties were compared with those of neat bitumen samples subjected to the same air-blowing treatment. Molecular modeling was also performed to investigate the interactions between acid and VB molecules.

One example of a suitable acid is polyphosphoric acid (PPA), which has the chemical formula $H_{n+2}P_nO_{3n+1}$ and a molecular weight of 337.93 (n=1). PAA can improve the high-temperature performance of an original (e.g., unmodified) bitumen by increasing its viscosity, softening point, and complex shear modulus (G*), as well as decreasing its penetration grade and phase angle (δ) at room temperature. Adding PPA to an original bitumen decreases the glass transition temperature (Tg), and the effect is amplified by increasing the PPA content. This effect depends at least in part on the amount of wax and asphaltene in the original bitumen. The colloidal index can be defined as the ratio of dispersed constituents (aromatics+resins) to flocculated constituents (saturates+asphaltenes) in the original bitumen. A higher colloidal index of a bitumen indicates a stronger interaction of that bitumen with PPA. Adding PPA may also disturb the hydrogen-bond network formation in bitumen, resulting in reducing the effective molecular weight of asphaltenes accumulated through hydrogen bonds and disruption of the asphaltenes-maltenes equilibrium. The use of size exclusion chromatography under high-speed conditions (HS-SEC) in combination with IATROSCAN® chromatography shows that modification by PPA resulted in an increase in asphaltene content and a more dispersed asphaltene structure, compared to the original bitumen.

The addition of PPA may adversely affect the low-temperature performance of the original bitumen and increase the low-temperature grade from −25° C. to −16.7° C. for bitumen modified with 1.6% PPA. However, PPA does not significantly influence the intermediate-temperature performance of original bitumen. Results of tests using a dynamic shear rheometer and a bending beam rheometer showed that using 0.5% of PPA has a positive effect on the Rolling Thin-Film Oven (RTFO) and Pressure Aging Vessel (PAV) aging characteristics of the original bitumen. Using infrared spectroscopy, an investigation of the effect of solar radiation on the aging of bitumen found that bitumen modified by PPA has a higher resistance to photo degradation than the original bitumen, for aging times of up to 200 hours.

PPA has a high interaction with most molecules in crude oil. The same percentage of PPA affects various bitumens differently, which can be attributed to the unexpected synergistic or antagonistic interplay between PPA and bitumen components. The PPA significantly increases intermolecular interactions and promotes the formation of internal structure within crude oil. However, the effect of PPA can be hindered by other additives (e.g., waxy structures), unless the PPA is anchored to a host (e.g., siliceous nanoparticles).

Silica nanoparticles can function as an anti-aging additive in bitumen. Both a rheology aging index and a carbonyl index determined by using Fourier transform infrared spectroscopy (FTIR) show that the aging mechanism of bitumen is delayed in the presence of silica nanoparticles. Additionally, adding silica nanoparticles to the original bitumen can enhance the rutting resistance of the bitumen, based on the specification parameters G*/sin δ, non-recoverable creep compliance ($J_{nr}$), and recovered creep (% R). Test results using a bending beam rheometer demonstrate that the addition of silica nanoparticles to bitumen does not change its flexural creep stiffness and stress relaxation compared to the original bitumen. Dispersing silica nanoparticles in bitumen can delay the bitumen's aging and enhance its durability. The silica nanoparticles can have a diameter in a range of about 10 nm to about 50 nm. Dispersion of silica in bitumen can be facilitated with compatibilizing agents such as 3-aminopropyl triethoxysilane (APTES) and 3-glycidyloxypropyl trimethoxysilane (GPTMS) grafted to a pristine silica surface. Another grafting chemical that can work as a compatibilizer is polyphosphoric acid (PPA), which shows a high affinity for adsorption to silica from one side and interaction with typical petroleum molecules from the other side. The modified bitumen can include about 90 wt % to about 97 wt % of the bitumen, about 2 wt % to about 6 wt % of the silica particles, and about 0.2 wt % to about 2 wt % of the acid component.

Treating modified bitumen includes contacting the modified bitumen with a flow of air, and removing the flow of air after a length of time (e.g., between 1 hour and 10 hours) when a penetration grade of the bitumen decreases to a specified value (e.g., 50 or 100). The temperature of the air can be in a range between 150° C. and 300° C.

EXAMPLES

Example 1

Materials. Vacuum bottom (VB) with a penetration grade of 200-300 (PG 46-28) was acquired from Pasargad Oil Company. Polyphosphoric acid (PPA) was obtained from Merck Millipore®. Properties of PPA are shown in Table 1. Nano-silica was acquired through US Research Nanomaterials. Table 2 shows some characteristics of silicon oxide nanoparticles according to the manufacturer's datasheet.

TABLE 1

Conventional properties of polyphosphoric acid (PPA)

| Property Title | Value |
|---|---|
| Boiling point | 530° C. (1013 hPa) |
| Density | 2.06 gr/cm$^3$ at 20° C. |
| Melting Point | −20° C. |
| Vapor pressure | 2 hPa at 20° C. |
| Assay (acidimetric, calc. as $P_2O_5$) | 83-87% |

TABLE 2

Characteristics of nano-silica

| Property Title | Value |
|---|---|
| Purity | 99+ % |
| Average Particle Size | 20-30 nm |
| Specific Surface Area (Based on BET result) | 115.33 m$^2$/g |
| Color | White |
| Bulk Density | <0.10 gr/cm$^3$ |
| True Density | 2.4 gr/cm$^3$ |

Sample Preparation. PPA-grafted silica was added to neat VB to prepare specimens. The dosages of adding PPA and nano-silica were selected to be 1 wt % and 4 wt %, respectively, based on the neat VB's weight.

Both PPA and silica nanoparticles were added to neat VB through an experimental air-blowing simulator. Two different methods were used as an accelerator for the air-blowing process: 1) pristine silica nanoparticles were added to the neat VB, and 2) PPA-grafted silica was added to the neat VB. The second method was produced via the solvent treatment of nano-silica with PPA to activate the silica surface.

For the second method, PPA was prepared by first adding 0.2 g of PPA to 10 mL of chloroform in a flask and mixing with magnetic stirring for one hour at 50° C. Then, 0.8 g of silica was added to the solution, followed by another 10 mL of chloroform. The mixture was stirred at 50° C. for another hour in an uncapped flask on a hotplate at 80° C. to evaporate the solvent completely. The particles were then dried on a rotary evaporator, and significant particle aggregation was observed.

Air-Blowing Method. To perform the air-blowing procedure, an experimental PÖRNER air-blowing simulator was used. The pilot plant was designed as a lab-scale unit to simulate the production line of air-blown bitumen. To produce air-blown bitumen, the air-blowing procedure is performed at a temperature of 240° C. for about 150 minutes to achieve a penetration grade of 60/70 from the preliminary VB penetration grade of 300. To obtain air-blown bitumen with higher or lower penetration grade, the time of the air-blowing procedure is decreased or increased, respectively. In this analysis, air blowing was performed at a temperature of 170° C. for 5 hours (300 minutes) to achieve the desired penetration grade and softening point and capture the bitumen stiffening trend. To better understand the effect of adding pristine nano-silica and PPA-grafted silica, a lower temperature of 170° C. was selected to prolong the air-blowing time and compare the stiffening trends of neat VB, VB modified with pristine nano-silica, and VB modified with PPA-grafted silica. Samples were collected every 30 minutes during the air-blowing procedure.

Test Methods. For each sample, penetration was measured following testing method standards from the American Society for Testing and Materials ASTM D5, and the softening point was measured according to ASTM D36. To investigate the effect of modification on performance grading (PG) of bitumens, ASTM D6373 was used to determine high and low service temperature of all samples at two conditions: 1) when the samples reached to penetration of 100; and 2) at the end of air blowing process when the samples reached to penetration of 50.

Computational method. Computational modeling within the framework of density functional theory (DFT) was used to analyze the role of PPA in enhancing the intermolecular interactions in VB. Calculations were performed using the Perdew-Burke-Ernzerhof (PBE) exchange-correlation functional, inclusive of Grimme's dispersion correction (PBE-D) with all electron double numerical-polarized basis set (DNP). Convergence criteria were set to $1.0\times10^{-5}$ hartree, $2.0\times10^{-3}$ hartree/Å, and $5.0\times10^{-3}$ Å for energy, maximum force, and displacement, respectively. All calculations were done using DMol3 modulus implemented in the Accelrys® Materials Studio program package (version 7).

The formula evaluated interaction energies is as follows:

$$E_{int}=E_{complex}-(\Sigma E_{fragment}) \quad (1)$$

here $E_{complex}$ is the total energy of the interacting system and $E_{fragment}$ is the energy of each fragment within the complex.

Aging is understood to increase polarity and asphaltene content of bitumen. Polar aromatics with sulfur content, including thiophene rings, are the main organosulfur in crude oil. Aged bitumen showed a high content of carbonyl and sulfoxide moieties. Two molecules were used as VB molecular models: an oxidized asphaltene with carbonyl content and an oxidized polar aromatic with sulfoxide content. The asphaltene molecule was taken from a modified Yen-Mullins island molecular model. Aged asphaltene molecule was built up from the unaged one by introducing oxygen atoms (e.g., carbonyl groups) to three benzylic positions of unaged asphaltene and truncation of long aliphatic chain to methyl and ethyl groups. Benzylic carbons are more susceptible positions to oxidation in this asphaltene model. The model contains a pyrrole ring, condensed fused aromatic rings and the polar oxygens that are the main targets for PPA's interaction. A polar aromatic molecule with sulfur content named benzobisbenzothiophene, which has been identified in petroleum, was used to construct the sulfoxide-containing molecular model. The two sulfur(S)

functional groups of the original molecule were replaced by two sulfoxide (S═O) groups. PPA oligomer with five repeating units was built and used in this analysis. The abbreviations OA and OPA are used to refer to oxidized asphaltene (containing carbonyl groups) and oxidized polar aromatics (containing sulfoxide groups), respectively.

Figure 2:
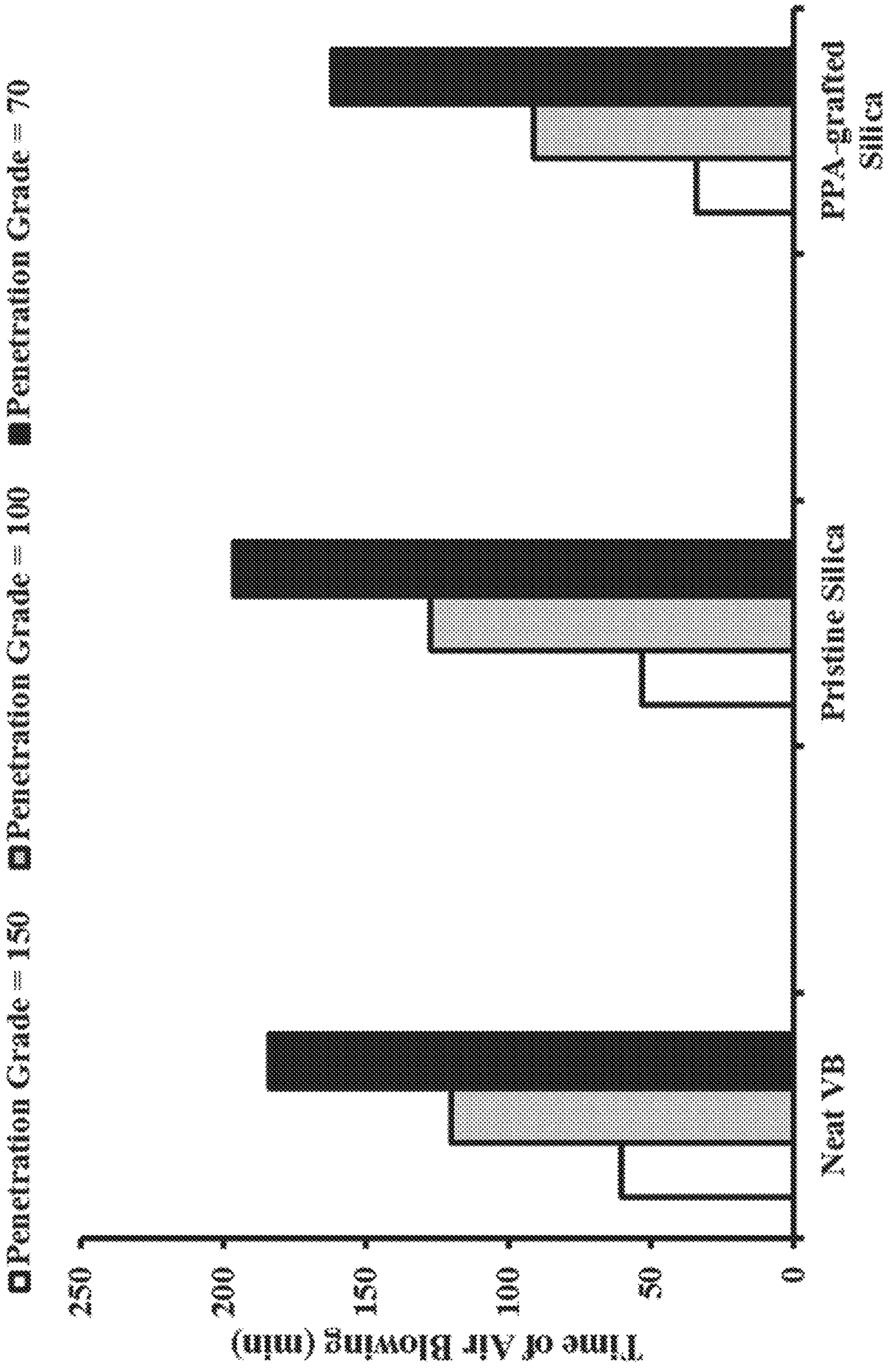
FIG. 2 shows a plot of the duration of air blowing to achieve various penetration grades for neat VB and VB modified with pristine silica and PPA-grafted silica.

Analysis of Results. FIG. 1 shows the penetration analysis results during the air-blowing process for VB with and without the additives. The curve was shifted down when PPA-grafted silica was introduced, which shows its effect on decreasing the time required for achieving the same penetration. To compare the effect of pristine silica with PPA-grafted silica on reducing the time of stiffening of the neat VB, three penetration grades were selected as target penetrations: 150, 100, and 70 (0.1 mm). FIG. 2 shows the time required to achieve each penetration grade for neat VB, VB modified by adding pristine silica, and VB modified by adding PPA-grafted silica. FIG. 2 indicates that introducing pristine silica to neat VB did not significantly change the required time. However, introducing PPA-grafted silica (in a combination of 1% PPA and 4% nano-silica) significantly reduced the time of air blowing to achieve penetration grades of 150, 100, and 70 by almost 27 minutes, 30 minutes, and 22 minutes, respectively. The PPA-grafted silica is more effective than pristine silica, as its time of air blowing is 25% shorter to meet a penetration grade of 100. Results show that grafting silica nanoparticles with PPA promotes intermolecular interaction with the neat VB, resulting in increased stiffness.

Figure 3:
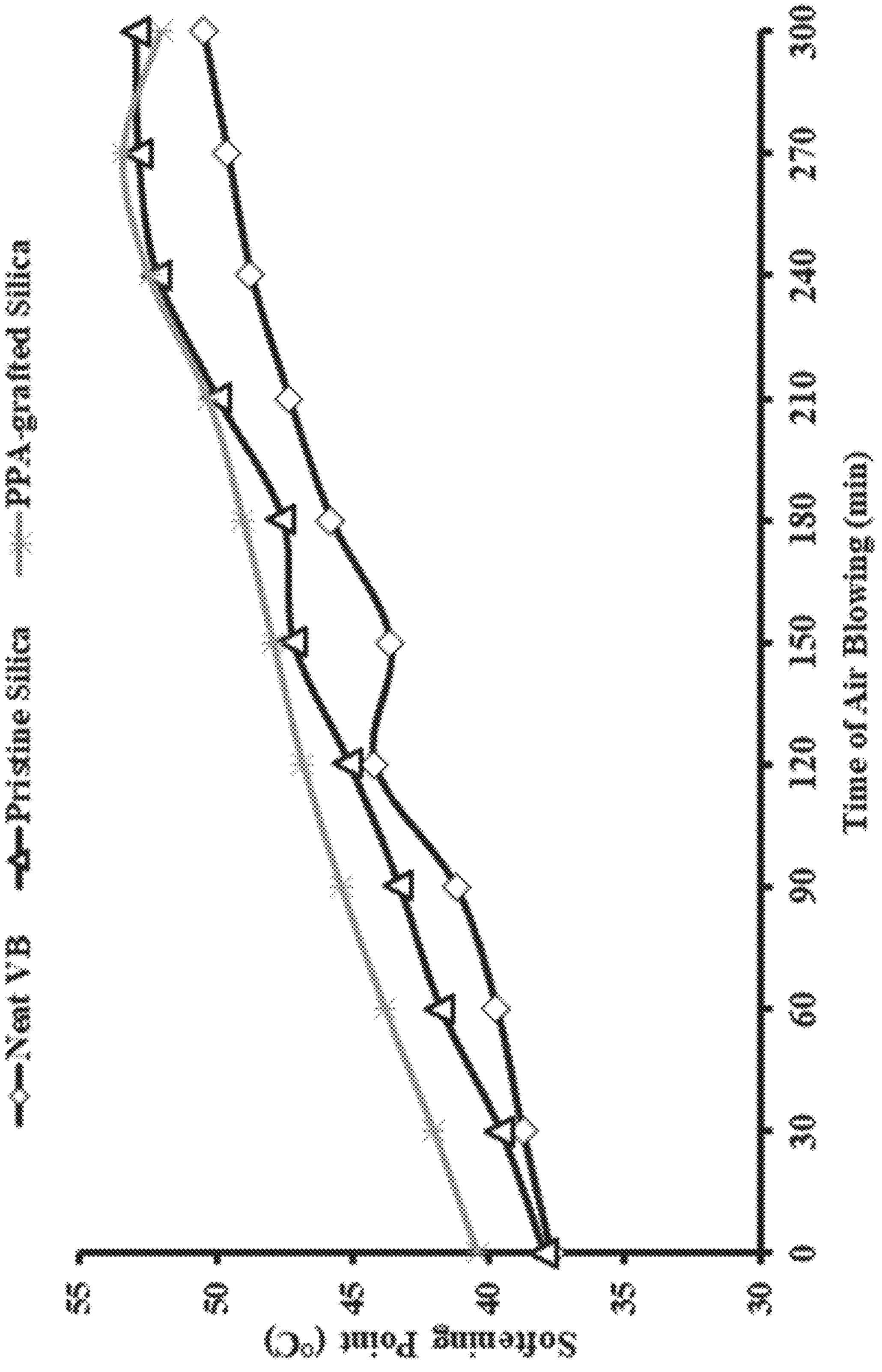
FIG. 3 shows a plot of the softening point versus duration of the air-blowing process for neat VB and VB modified with pristine silica and PPA-grafted silica.
Figure 4:
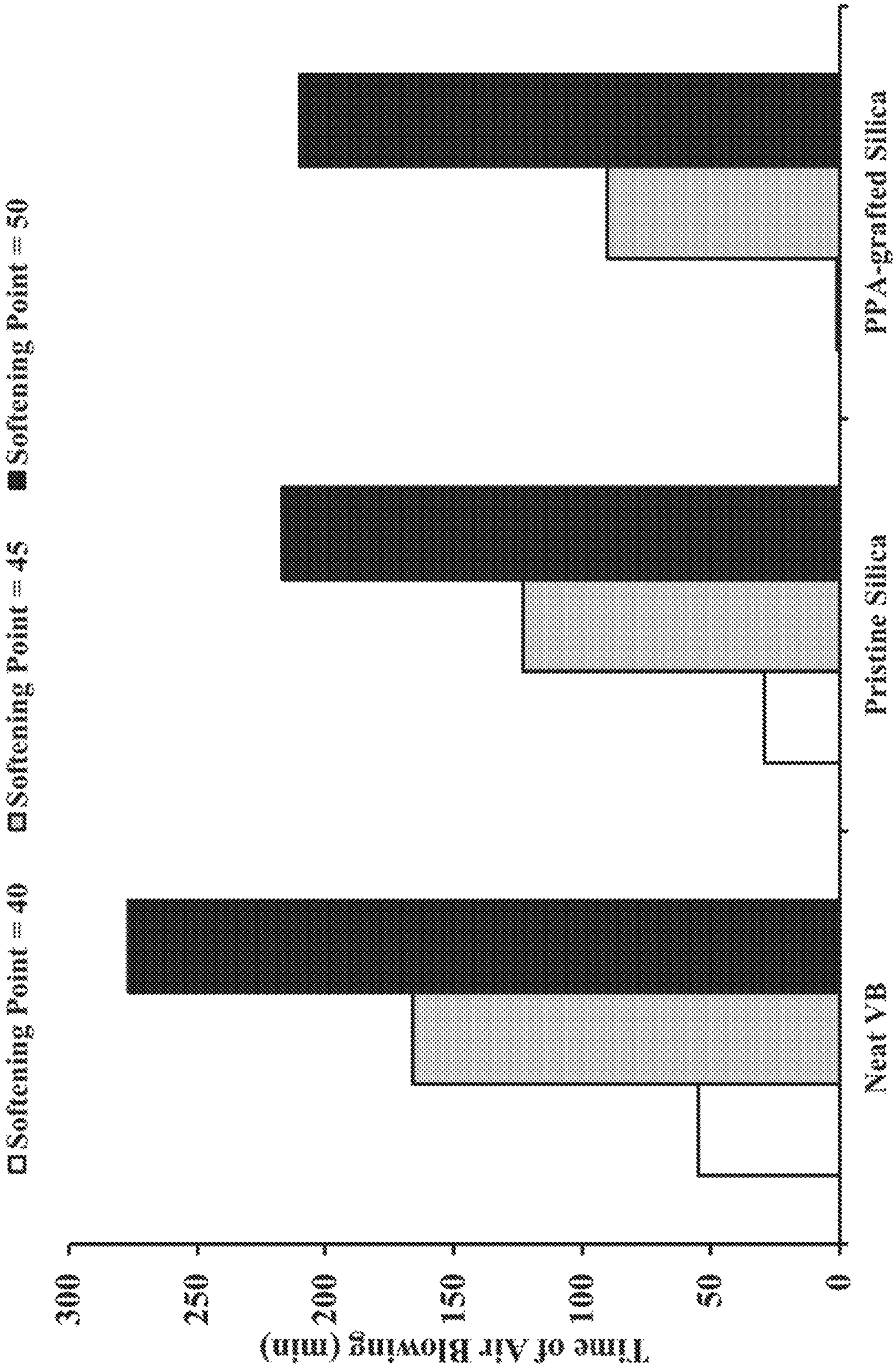
FIG. 4 shows a plot of the duration of air blowing to achieve various softening points for neat VB and VB modified with pristine silica and PPA-grafted silica.

Results for the softening point are shown in FIG. 3. It is evident that higher softening points are related to the sample modified with PPA-grafted silica, which is expected based on the penetration results presented in FIG. 1. To achieve the softening point of 45° C., which is a conventional softening point for bitumen used in the asphalt industry, it can be seen that the required air-blowing time was reduced up to 25% (from 120 min to 90 min) in the presence of PPA-grafted silica. Similar to FIG. 2, the effect of pristine silica on reducing the time of stiffening of the neat VB is compared with the effect of PPA-grafted silica. For this purpose, three target softening points were considered: 40° C., 45° C., and 50° C. FIG. 4 shows the time required to achieve each softening point for neat VB, VB modified by adding pristine silica, and VB modified by adding PPA-grafted silica.

Based on FIG. 4, adding either pristine silica or PPA-grafted silica to neat VB notably reduced the time of air blowing to achieve a softening point of 40° C., 45° C., or 50° C. As is evident from FIG. 4, the effect of PPA-grafted silica on reducing the required time of air blowing to drop the softening point is greater than the effect of pristine silica. Introducing PPA-grafted silica reduced the air-blowing time to achieve a softening point of 40° C., 45° C., and 50° C. by 53 min, 75 min, and 67 min, respectively, while introducing pristine silica reduced the air-blowing time by 25 min, 42 min, and 59 min, respectively. The reduction in air-blowing time from adding PPA-grafted silica is 2.12, 1.78, and 1.13 times the reduction from adding pristine silica. It is evident that PPA-grafted silica is more effective than pristine silica for the reducing the air-blowing time required to drop the softening point of VB.

Figure 5:
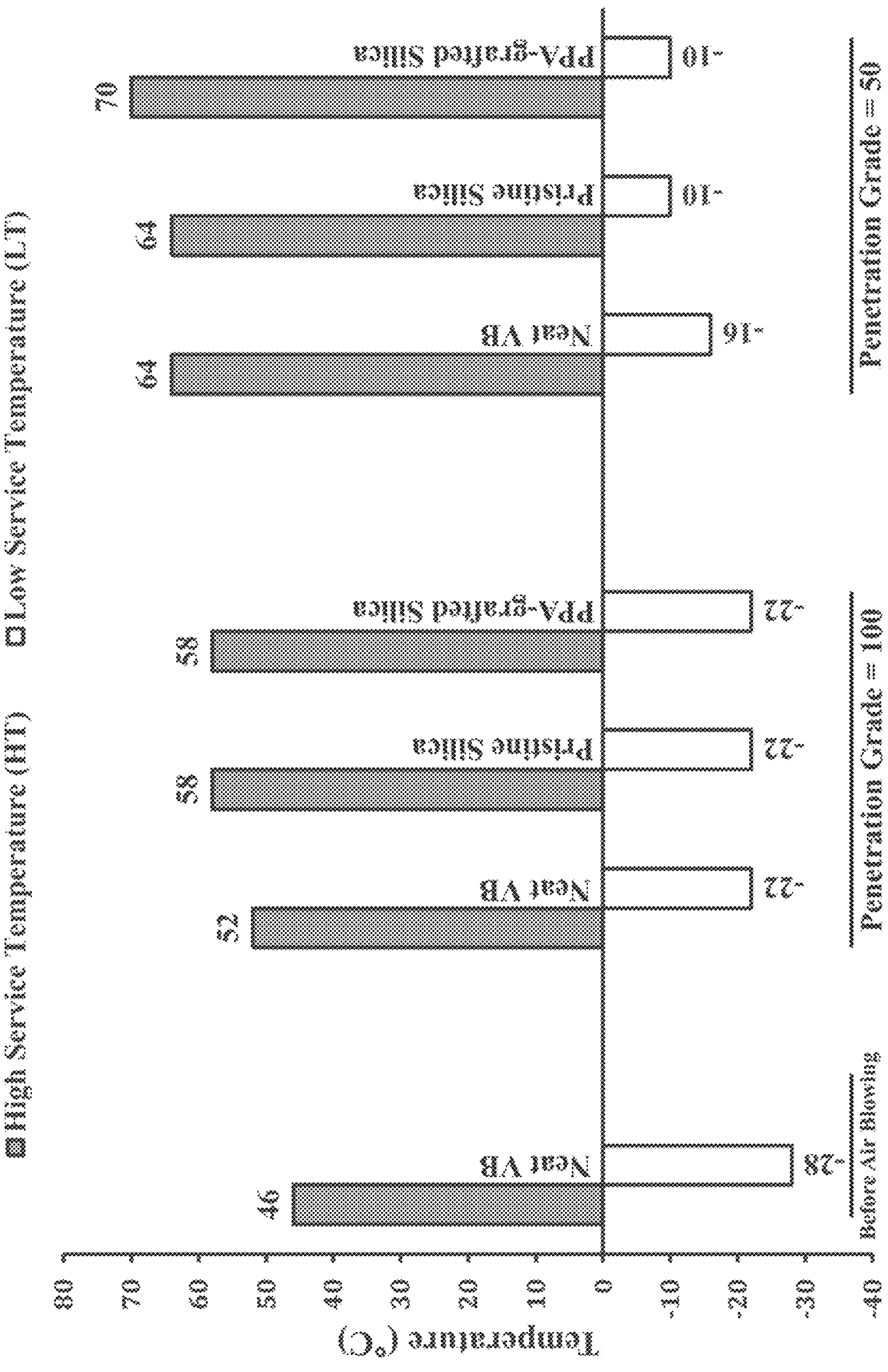
FIG. 5 shows a plot of the performance grading of the neat VB and VB modified with pristine silica and PPA-grafted silica after reaching penetration grades of 100 and 50 in the air blowing process.

FIG. 5 shows performance grading of all samples under two conditions: after reaching penetration grade of 100 (0.1 mm); and at the end of the air blowing process reaching a penetration grade of 50 (0.1 mm). FIG. 5 shows that using both types of modification improved the high service temperature of bitumen by one grade while it did not alter the low service temperature. Using PPA-grafted silica enhanced high service temperature by one grade. Both modifications had similar effects on low service temperature of the bitumen. Therefore, it can be concluded that to produce a bitumen which is appropriate for use in cold regions, both pristine silica and PPA-grafted silica can be viable alternatives, and its effect on energy saving should be a criterion for selecting the modification type.

Molecular modeling results. Asphaltene, as the most polarizable component of bitumen with condensed fused aromatic rings in its structure, is the main target for interacting with PPA. Polar aromatics are another target for interaction with polar PPA oligomers. PPA has a high tendency toward interacting with silicate surfaces. As PPA is not a straight-chain oligomer, it can act as a bridge between silica and bitumen compounds. The interactions of PPA with both OA and OPA models of bitumen were calculated to evaluate the affinity of PPA toward the bitumen components. The high affinity of the PPA oligomer toward these bitumen components facilitates the dispersion of silica within the bituminous and increases the intermolecular interactions.

Figure 6A:
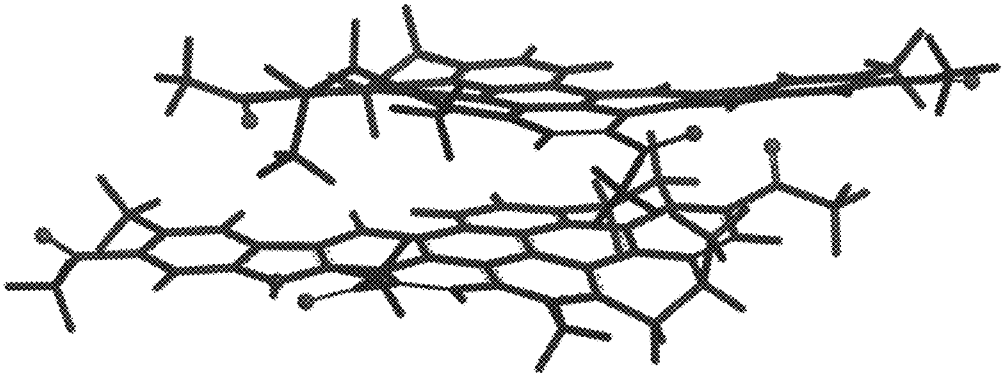
FIG. 6A illustrates the interactions of an oxidized asphaltene dimer ($E_{int}$=−42.8 kcal/mol).
Figure 6B:
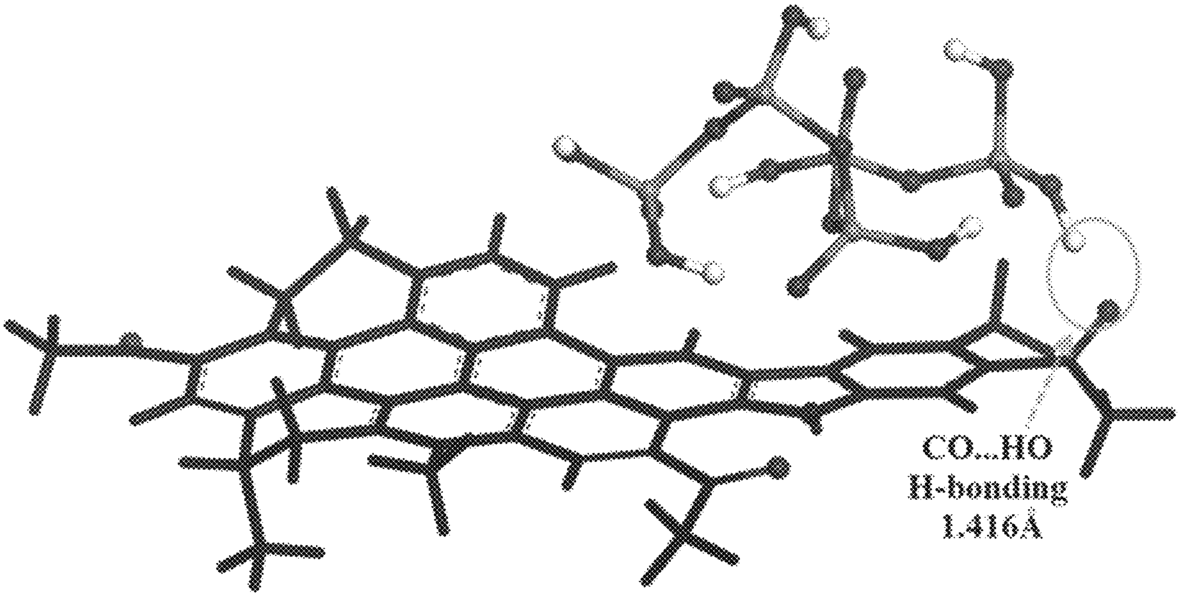
FIG. 6B illustrates the interactions of PPA with oxidized asphaltene ($E_{int}$=−46.9 kcal/mol).
Figure 6C:
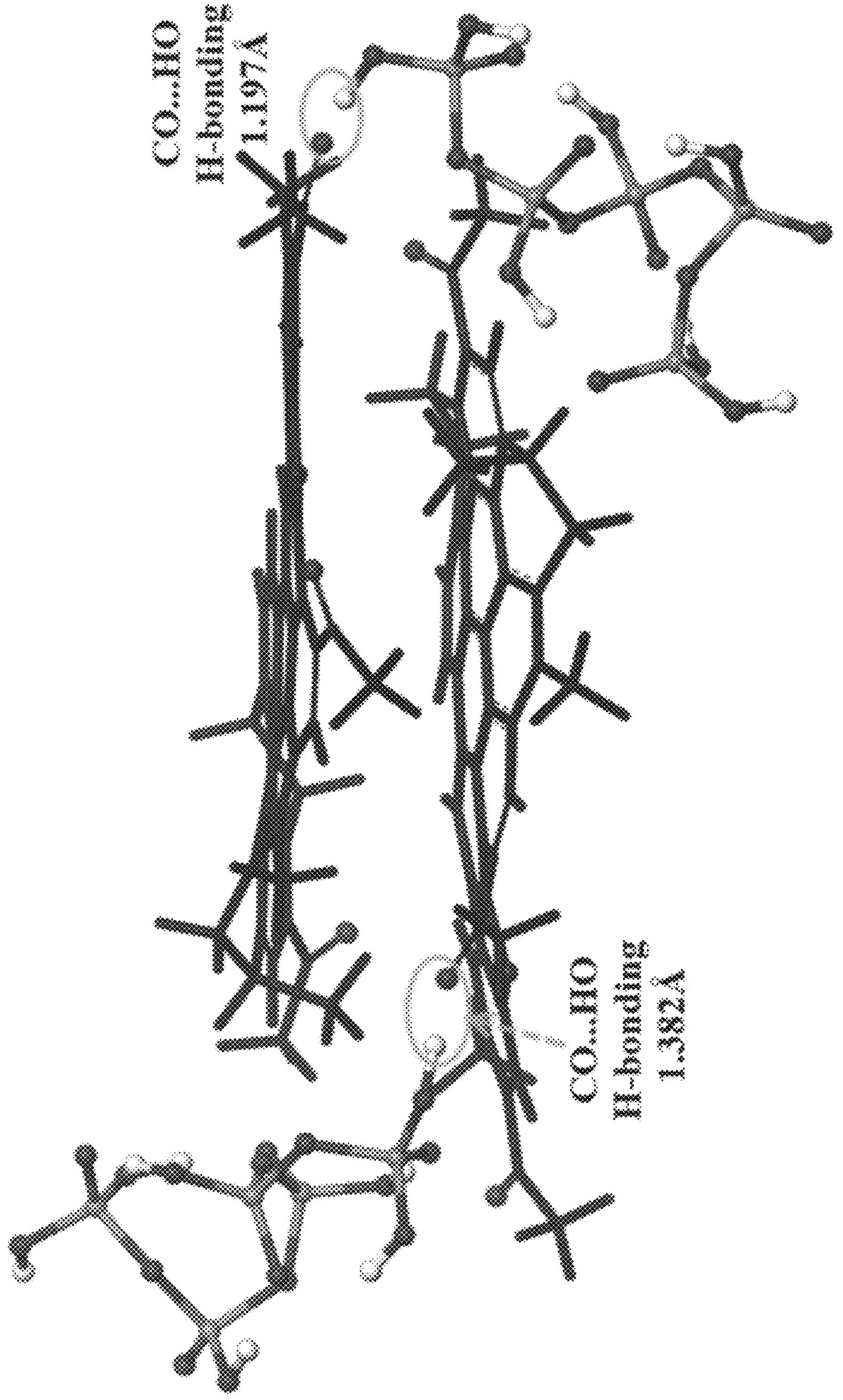
FIG. 6C illustrates the interactions of a system including two PPA molecules and an oxidized asphaltene dimer ($E_{int\ (two\ PPA\text{-}OA\ dimer)}$=−110.0 kcal/mol and $E_{int\ (OA\text{-}OA)}$=−47.2 kcal/mol).
Figure 7A:
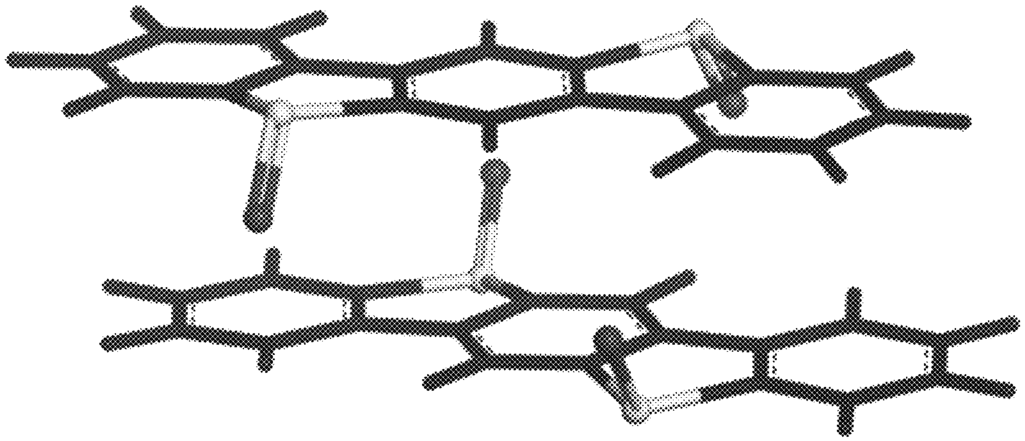
FIG. 7A illustrates interactions of a benzobisbenzothiophene dimer ($E_{int}$=−28.1 kcal/mol).
Figure 7B:
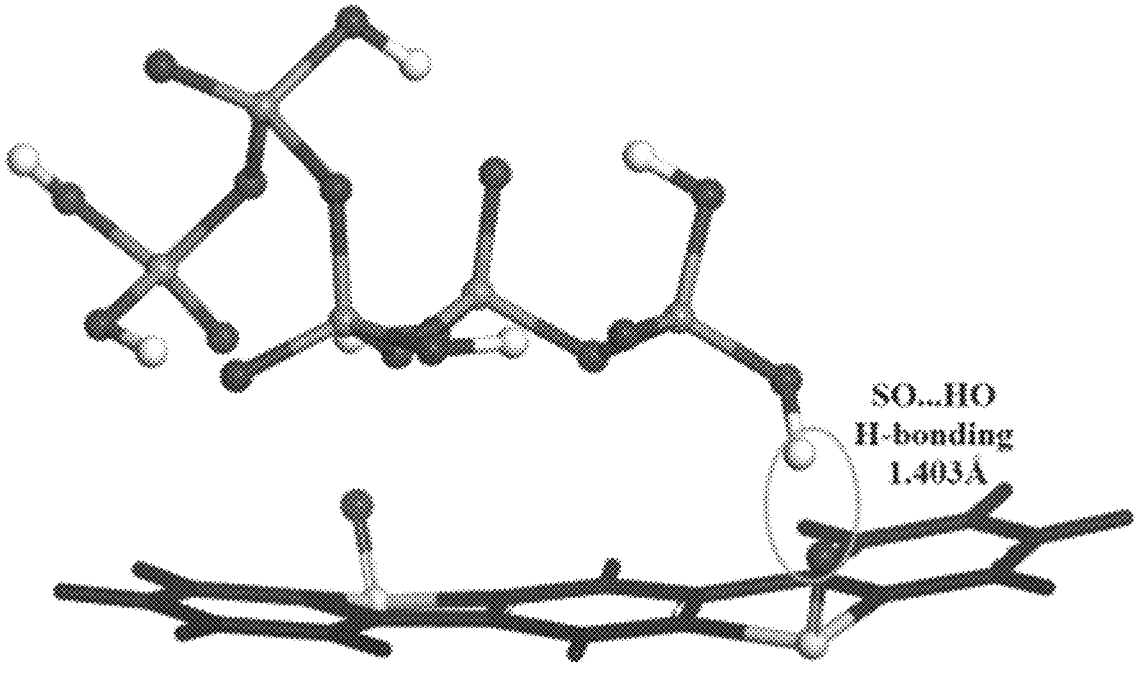
FIG. 7B illustrates interactions of a PPA molecule with benzobisbenzothiophene ($E_{int}$=−32.8 kcal/mol).
Figure 7C:
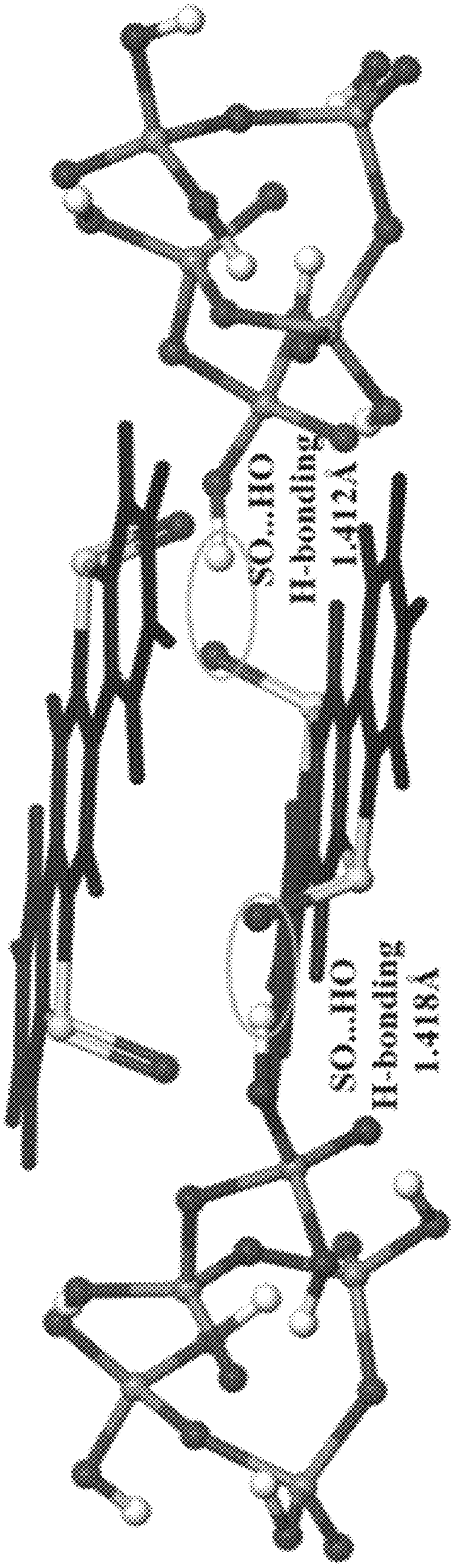
FIG. 7C illustrates interactions of a system including two PPA molecules and a benzobisbenzothiophene dimer ($E_{int\ (two\ PPA\text{-}OPA\ dimer)}$=−68.9 kcal/mol and $E_{int\ (OPA\text{-}OPA)}$=−29.6 kcal/mol).

FIGS. 6A-6C illustrate the interactions of: an oxidized asphaltene dimer ($E_{int}$=−42.8 kcal/mol); PPA with oxidized asphaltene ($E_{int}$=−46.9 kcal/mol); and a system including two PPA molecules and an oxidized asphaltene dimer ($E_{int\ (two\ PPA\text{-}OA\ dimer)}$=−110.0 kcal/mol and $E_{int\ (OA\text{-}OA)}$=−47.2 kcal/mol), respectively. FIGS. 7A-7C illustrate interactions of: a benzobisbenzothiophene dimer ($E_{int}$=−28.1 kcal/mol); a PPA molecule with benzobisbenzothiophene ($E_{int}$=−32.8 kcal/mol); and a system including two PPA molecules and a benzobisbenzothiophene dimer ($E_{int\ (two\ PPA\text{-}OPA\ dimer)}$=−68.9 kcal/mol and $E_{int\ (OPA\text{-}OPA)}$=−29.6 kcal/mol), respectively.

According to the results, interactions of PPA with both OA shown in FIG. 6B (−46.9 kcal/mol) and OPA shown in FIG. 7B (−32.8 kcal/mol) are consistent with significant interaction energies. The acidic OH head of PPA forms hydrogen bonds with both the C═O group of OA and the S═O group of OPA. The backbone of PPA stands parallel to the polar aromatic zone in both interactions to provide a more binding through the electrostatic and dispersion attractions. The interaction energies for OA and OPA dimers shown in FIGS. 6A and 7A respectively were also calculated. Results show stronger interactions for PPA-OA and PPA-OPA compared to OA-OA and OPA-OPA, respectively. In FIG. 6B, PPA has been located at the most polar aromatic zone of OA molecule, leaving the coronene core aromatic part free to interact with another PPA molecule or a PPA molecule with a longer chain to provide even more interaction energies. The results indicate the high affinity of PPA to penetrate among the VB molecules and gather the oxidized VB molecules in a polar medium around itself, leading to an increase in intermolecular interactions.

The interaction of PPA oligomer with both OA and OPA dimers was analyzed. The OA-OA and OPA-OPA interactions were analyzed in the presence and absence of PPA. Two PPA were placed at the edges of an OA dimer as shown FIG. 6C and an OPA dimer as shown in FIG. 7C. Results show high interaction energy for the interaction of the two PPA with OA dimer (−110.0 kcal/mol) as well as for that of the two PPA with OPA dimer (−68.9 kcal/mol). This further demonstrates the tendency of PPA to increase the polarity and overall intermolecular interactions of the VB molecular assemblies. Calculated interaction energies for OA-OA and OPA-OPA within these complexes showed the effect of PPA molecules on strengthening VB-VB molecular interactions. The latter increase is greater in the case of asphaltene dimer, in which the OA dimer interaction energy increased from −42.8 kcal/mol to −47.2 kcal/mol as shown in FIGS. 6A and 6C, respectively.

This analysis indicates that PPA can influence the properties of VB via two mechanisms. 1) PPA can strongly interact with VB molecules as well as with VB molecular assemblies. These interactions facilitate the penetration of PPA among VB molecules and their assemblies and thus into the bitumen matrix. 2) PPA can strengthen some VB-VB molecular interactions.

Figure 8A:
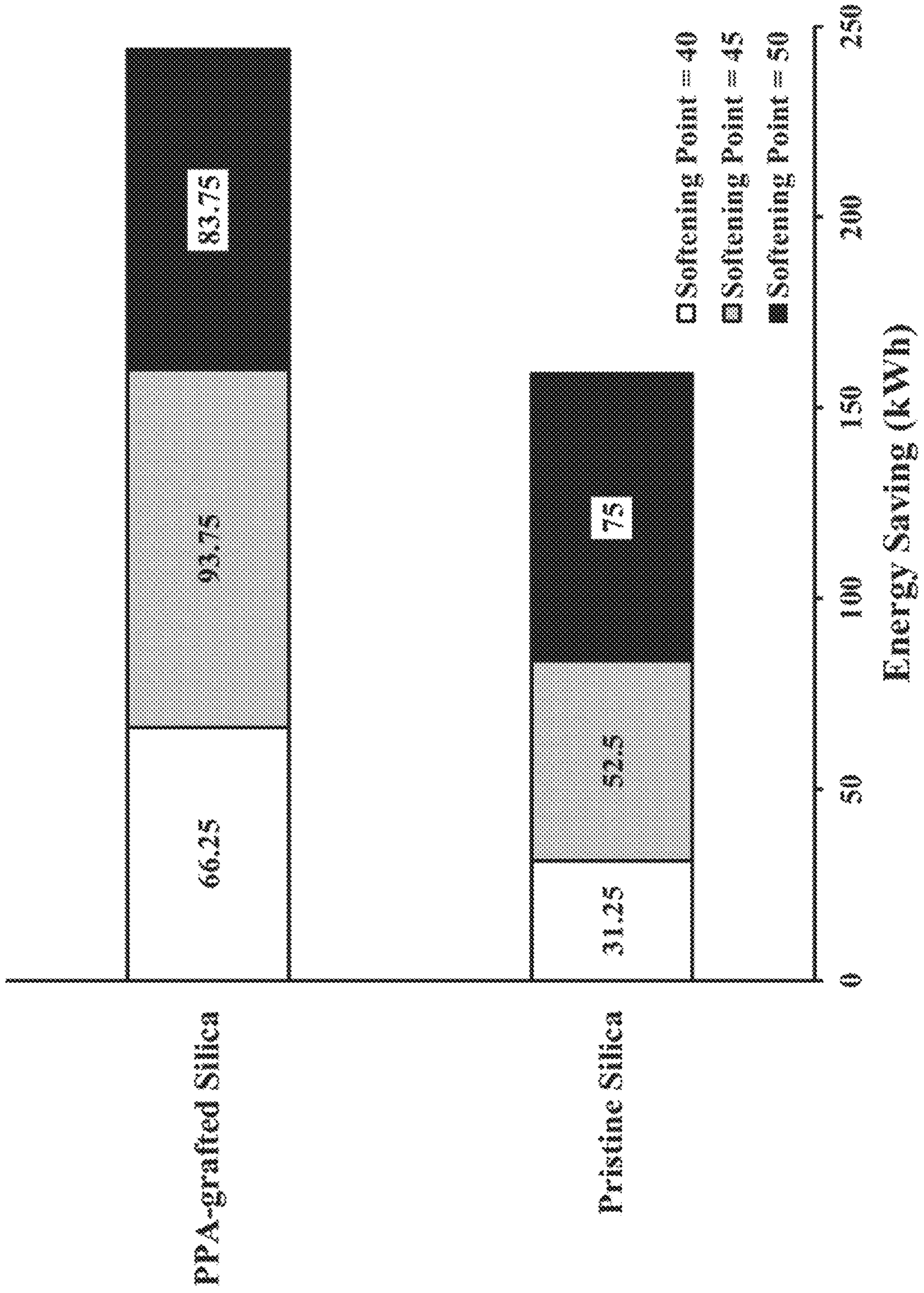
FIGS. 8A and 8B show plots of the energy consumption for production of 100 tons air-blown bitumen with different softening points and penetration grades, respectively.
Figure 8B:
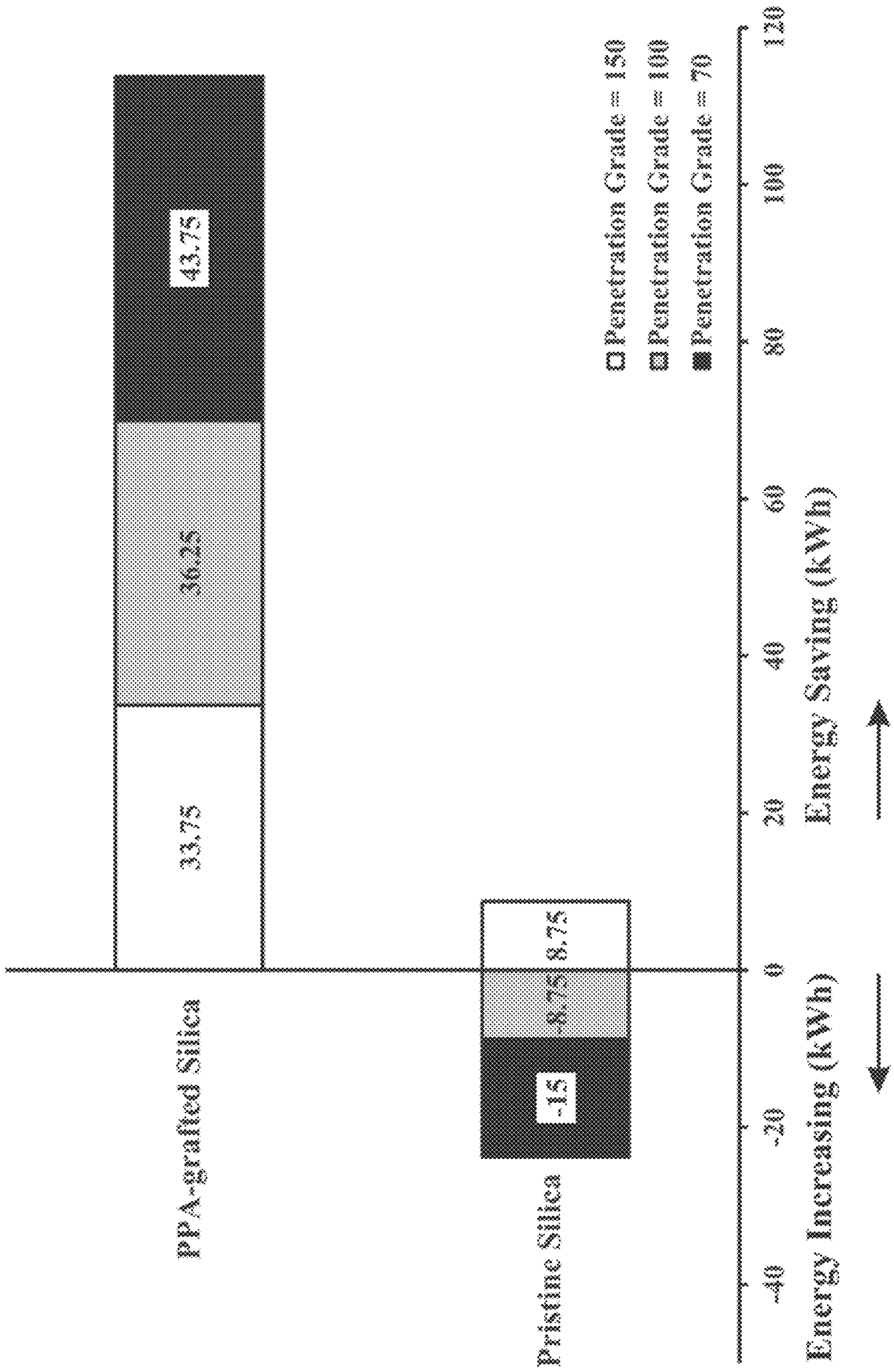

Economics and the environment. The heat capacity of bitumen is 2.7 $kJkg^{-1}K^{-1}$ for the temperature of 170° C. (443 K). The consumption of 0.75 kW/hour (0.0125 kW/minute) is required to maintain 1 ton of bitumen at a constant temperature of 170° C., neglecting wasted energy due to convection. Therefore, reducing the air-blowing time resulted in a savings of the energy required to provide the needed temperature of the air-blowing process. FIGS. 8A and 8B show the effect of introducing pristine silica and PPA-grafted silica to neat VB on energy consumption when producing 100 tons of air-blown bitumen, based on both penetration grade and softening point. FIG. 8A shows that adding PPA-grafted silica to neat VB saved up to 93.75 kWh energy to produce 100 tons of air-blown bitumen. In contrast, FIG. 8B shows that adding pristine silica to neat VB increased the energy required to achieve some exceptional penetration grades. For an ordinary air-blown bitumen production plant with 100 ton/hr capacity, introducing PPA-grafted silica to the neat VB makes it possible to save 2680 kWh per day (assuming 24 hours of production) when producing air-blown bitumen with a 60/70 penetration grade. To better understand the advantage of such an energy-saving, it can be stated that the average electrical power consumption of a house in an urban area is about 75 kWh per month. Therefore, the energy saved by using PPA-grafted silica in one day of the air-blowing process could power 35 houses for a month. It is evident that the energy savings affect economic and environmental issues simultaneously.

To better investigate the effect of reducing air-blowing time on environmental issues, data for exhausted gas emissions for five different days was acquired for an air-blown bitumen production factory located in Tehran, Iran. Table 3 shows part of the data for CO, $CO_2$, and $SO_2$ as polluting, toxic gases measured by using a TESTO® 350XL analyzer at the height of 8 m of the chimney of combustion sources output. Although the current occupational safety and health administration (OSHA) permissible exposure limit (PEL) for carbon monoxide is 50 parts per million (ppm) parts of air, Table 3 indicates that the amount of CO was at least 1.82 times this threshold. Also, the PEL of $SO_2$ is 75 ppm according to the U.S. environmental protection agency (EPA), and it can be seen that the amount of $SO_2$ is marginal on some days.

TABLE 3

Exhausted gas emissions from the chimney of combustion sources output of a bitumen production factory

| | $CO_2$ (%) | CO (ppm) | $SO_2$ (ppm) |
|---|---|---|---|
| Day#1 (Aug. 26, 2020) | 3.8 | 97 | 75 |
| Day#2 (Jun. 20, 2020) | 3.6 | 102 | 61 |
| Day#3 (Feb. 21, 2020) | 3.82 | 91 | 67 |
| Day#4 (Dec. 16, 2019) | 5.9 | 201 | 52 |
| Day#5 (Sep. 22, 2019) | 6.2 | 254 | 47 |

It is apparent that reducing the air-blowing time causes a reduction in the release of polluting, toxic gas emissions into the air. By considering a constant production capacity for a bitumen production plant, it is possible to reduce air-blowing time up to 25%. This means that a bitumen factory could operate for four years and release polluting and toxic emissions as if it operated for three years.

Example 2

Materials. The vacuum bottom residue (VBR) used in this study was provided by Pasargad Oil Company. The penetration grade of the VBR was 200-300, equivalent to PG 46-28. The two additives for VBR were polyphosphoric acid (PPA, supplied by Merck Millipore) and silicon-oxide nanoparticles (nano-silica, supplied by US Research Nanomaterials). Table 4 specifies the characteristics of PPA. The characteristics of silicon-oxide nanoparticles are reported in Table 5, based on the manufacturer's datasheet.

TABLE 4

Conventional properties of polyphosphoric acid (PPA)

| Property | Value |
|---|---|
| Density at 20° C. | 2.06 $g/cm^3$ |
| Melting Point | −20° C. |
| Boiling point | 530° C. (1013 hPa) |
| Vapor pressure at 20° C. | 2 hPa |
| Assay (acidimetric, calc. as $P_2O_5$) | 83-87% |

TABLE 5

Conventional properties of silicon-oxide nanoparticles (nano-silica)

| Property | Value |
|---|---|
| Color | White |
| Purity | 99 + % |
| True Density | 2.4 $g/cm^3$ |
| Bulk Density | <0.10 $g/cm^3$ |
| Average Particle Size | 20-30 nm |
| Specific Surface Area (Based on BET result) | 115.33 $m^2/g$ |

Sample preparation. VBR and PPA-grafted silica were mixed to prepare the specimens. The amounts of PPA and nano-silica in the blend were set to be 1% and 4% of the VBR weight, respectively. A laboratory air-blowing simulator was used to mix PPA and silica nanoparticles with neat VBR. Two procedures were used to accelerate the air-blowing process. In the first procedure, pristine PPA was added to neat VBR. In the second procedure, PPA-grafted silica was added to neat VBR. In the latter method, PPA acts as a surface activation agent (surfactant) for nano-silica particles.

In order to produce PPA-grafted silica for the second method, the following procedure was performed: 0.2 g of PPA was added to 10 mL of chloroform, and the two were blended by magnetic stirring for 60 minutes at 50° C. 0.8 g of silica was put into the blend. Subsequently, 10 mL of chloroform was added to the mix again. The mix was stirred for an hour at 50° C. Then the flask was uncapped and placed on a hotplate at 80° C. to fully evaporate the solvent. Finally, the particles were dried on a rotary evaporator, and substantial particle aggregation was noticed.

Air-blowing procedure. A laboratory air-blowing simulator, PORNER, was used to perform the air-blowing procedure in the laboratory. The PORNER pilot plant is a lab-scale device that can simulate a production line for air-blown bitumen. Assuming an initial penetration grade of 300 for VBR, 150 minutes of air-blowing at 240° C. yields air-blown bitumen with a penetration grade of 60/70. The air-blowing duration can be adjusted for other desired penetration grades: a longer duration for lower penetration grades and a shorter duration for higher penetration grades. In this analysis, to better demonstrate the effects of pristine PPA and PPA-grafted silica on the air-blowing procedure, a lower temperature of 170° C. was used. The air-blowing duration was lengthened to five hours, which made possible the comparison of the stiffening trend for neat VBR and VBR modified with additives. Penetration grade and softening point were investigated by performing these tests on samples collected every 30 min throughout the air-blowing procedure.

Test methods. For the samples taken, penetration was measured in accordance with ASTM D5, and the softening point of each sample was measured using ASTM D36 as a reference. This determination was done while considering two conditions for each sample: 1) when the penetration grade dropped to the two levels of 90 and 60 (0.1 mm); and 2) when the softening point reached 40° C. and 45° C.

Computation Method. Density functional theory (DFT) was used to study the intermolecular interactions of candidate VBR components with pure PPA and PPA-grafted silica. All interactions were studied via non-periodic DFT calculations using the DMol3 modulus implemented in the Accelrys Materials Studio program package (version 7). The Perdew-Burke-Ernzerhof (PBE) exchange-correlation functional with Grimme's dispersion correction (PBE-D) and all-electron double-numerical polarized basis set (DNP) was applied. For geometry optimizations, the convergence criteria were $2.0\times10^{-5}$ hartree for energy, $4.0\times10^{-3}$ hartree/Å for maximum force, and $5.0\times10^{-3}$ Å for displacement. Binding energies were calculated using Eq. (1).

Molecular modeling. Silica cluster. A cluster approach was used to model the silica surface. Using a Preliminary Periodic Boundary Condition (PBC) approach, a 2×2×1 Å supercell was built from the unit cell of α-quartz with optimized parameters of a=b=4.928 Å, c=5.428 Å, α=β=90.0°, and γ=120.0°. The silica supercell was then fully optimized at the PBE-D level and with a quality of "fine" grid using CASTEP modulus embedded in the Accelrys Materials Studio program package (version 7). A (001) Miller basal plane was cleaved out of the optimized 2×2×1 super cell; dangling bonds were saturated with H and OH end groups, and the periodic condition was removed from the system. The resulting silica cluster model was used for this study.

PPA oligomer. PPA is prepared in different grades; the number of repeat units in each PPA grade varies from one chain to another. It has been shown that PPA grades higher than 114% contain the lowest number of $H_3PO_4$ monomers; almost all of them have been converted to chains with 2-14 units. Considering the size of the molecular units and clusters used in this study, a PPA oligomer with five repeat units was optimized for this study.

PPA-grafted silica. A silica cluster model with a PPA oligomer adsorbed on its surface was used as PPA-grafted silica. A PPA oligomer with five repeat units was used.

Volatiles. This study used seven candidate volatile molecules: Alkan1 and Alkan2 (two saturate molecules); benzofuran; benzothiophene; benzene; naphthalene; and benzoic acid.

Sulfur compounds. This study used these candidate sulfur compounds: benzothiophene from the thiophene class; dibutyl sulfide from the sulfide class; dipropyl disulfide from the disulfide class; and Ss as a model for elemental sulfur. The oxidized forms of the mentioned compounds, including a sulfoxide functional group (S═O) in their structures, were also considered: benzothiophene sulfoxide; dibutyl sulfoxide; dipropyl disulfoxide; and $S_8O$.

Figure 9:
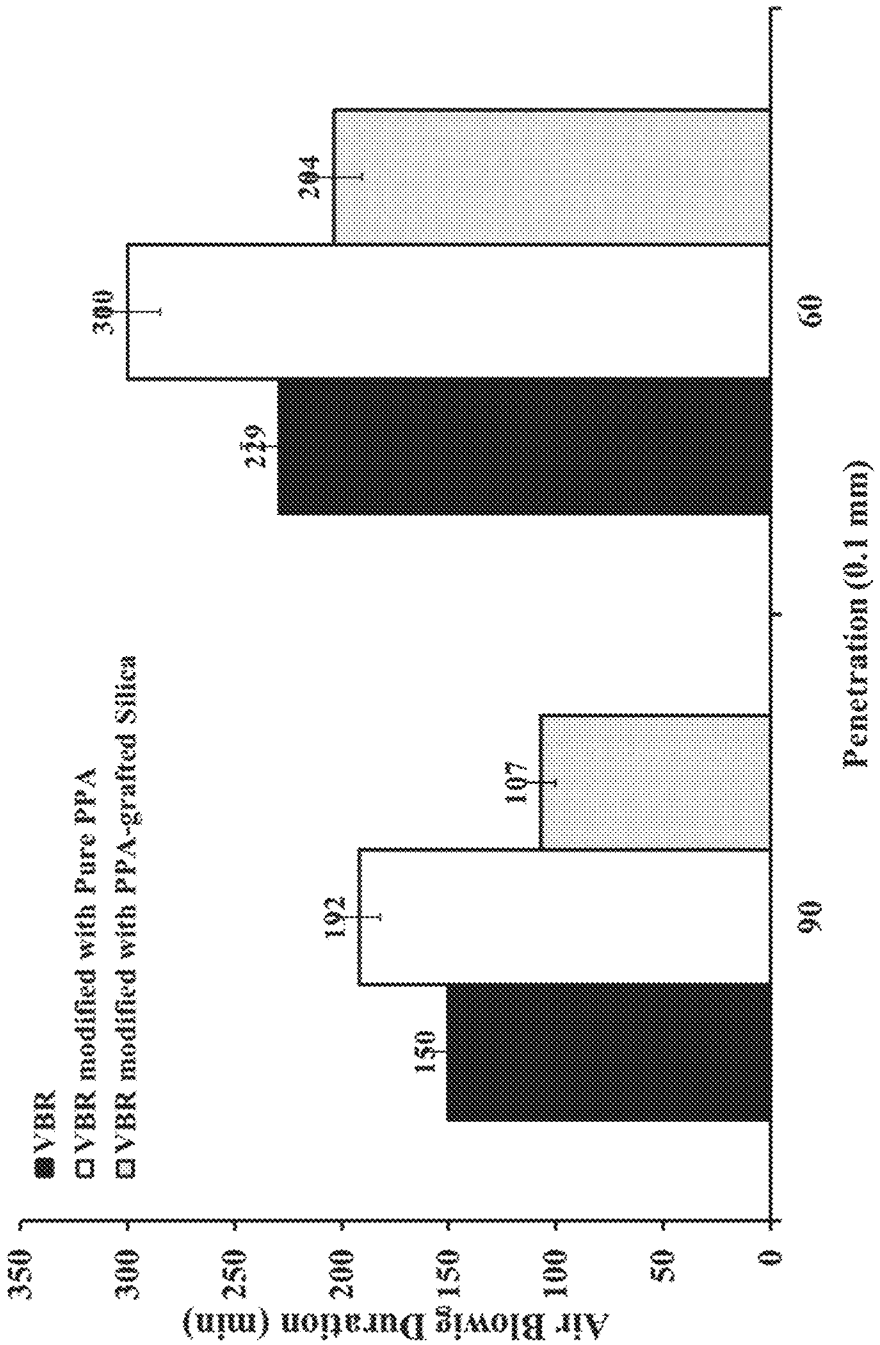
FIG. 9 shows a plot of the air-blowing time used to achieve penetration grades of 90 and 60 (0.1 mm) for vacuum bottom residue (VBR) with and without additives

Results. FIG. 9 shows the required air-blowing time to reach two target penetration grades: 90, and 60 (penetration 0.1 mm). The times were determined using simple interpolation between two consecutive air-blowing times. As can be seen, introducing pure PPA to VBR significantly increases the required air-blowing time. However, introducing PPA-grafted silica reduced the air-blowing time to achieve the desired penetration grades of 90 and 60 by almost 43 and 24 minutes, respectively. Using PPA-grafted silica is more effective since the air-blowing time for VBR with PPA-grafted silica to reach a penetration grade of 90 is 29% shorter than the time for VBR.

Figure 10:
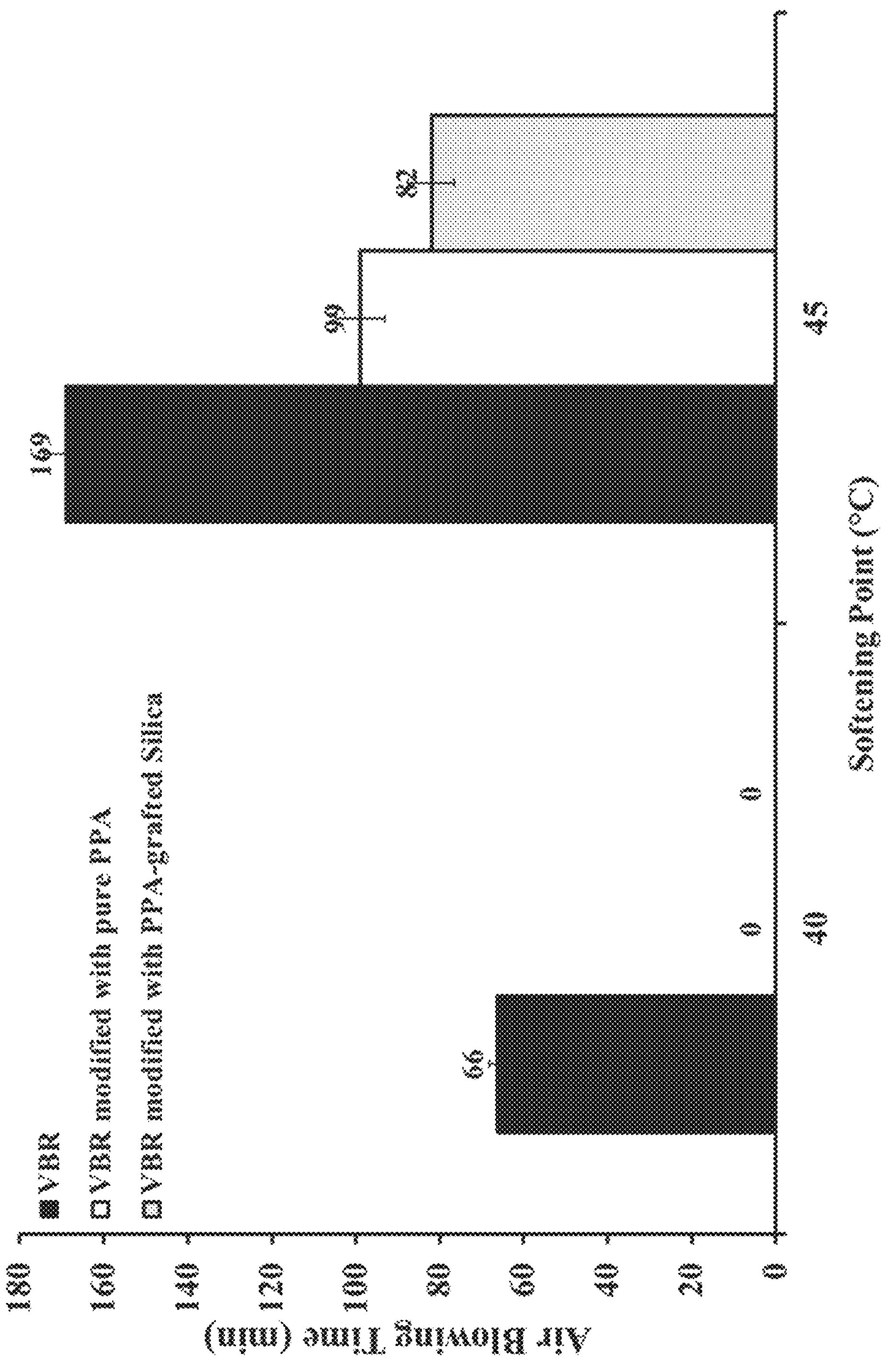
FIG. 10 shows a plot of the air-blowing time used to achieve the softening point of 40° C. and 45° C. for VBR with and without additives

FIG. 10 shows the results for the softening point. Adding pure PPA and PPA-grafted silica to VBR increases the softening point. According to the results, adding either pure PPA or PPA-grafted silica to VBR reduced the air-blowing time to accomplish a softening point of 40° C. or 45° C. Introducing pure PPA reduced the air-blowing time to reach the desired softening points of 40° C. and 45° C. by almost 66 and 70 minutes, respectively. Introducing PPA-grafted silica reduced the air-blowing time by 66 and 87 minutes, respectively. Using PPA-grafted silica to reduce the air-blowing time is more effective in achieving the softening point of 45° C., which diminishes the air-blowing time by 87 minutes. The required air-blowing time was reduced by 51% (from 169 min to 82 min) in the presence of PPA-grafted silica.

This study obtained the result that PPA-grafted silica reduced the duration of air blowing. This study's experiment showed that PPA-grafted silica outperformed PPA in reducing the duration of air blowing and increasing the stiffness of VBR. This can be due to increased intermolecular interactions between PPA-grafted silica and bitumen's components. The possible intermolecular interactions between the bitumen molecules and modifiers can be analyzed using chemical concepts and molecular modeling. This study used the density functional theory (DFT) method to evaluate plausible interactions between candidate VBR molecules and the modifiers PPA-grafted silica and PPA.

Figure 11:
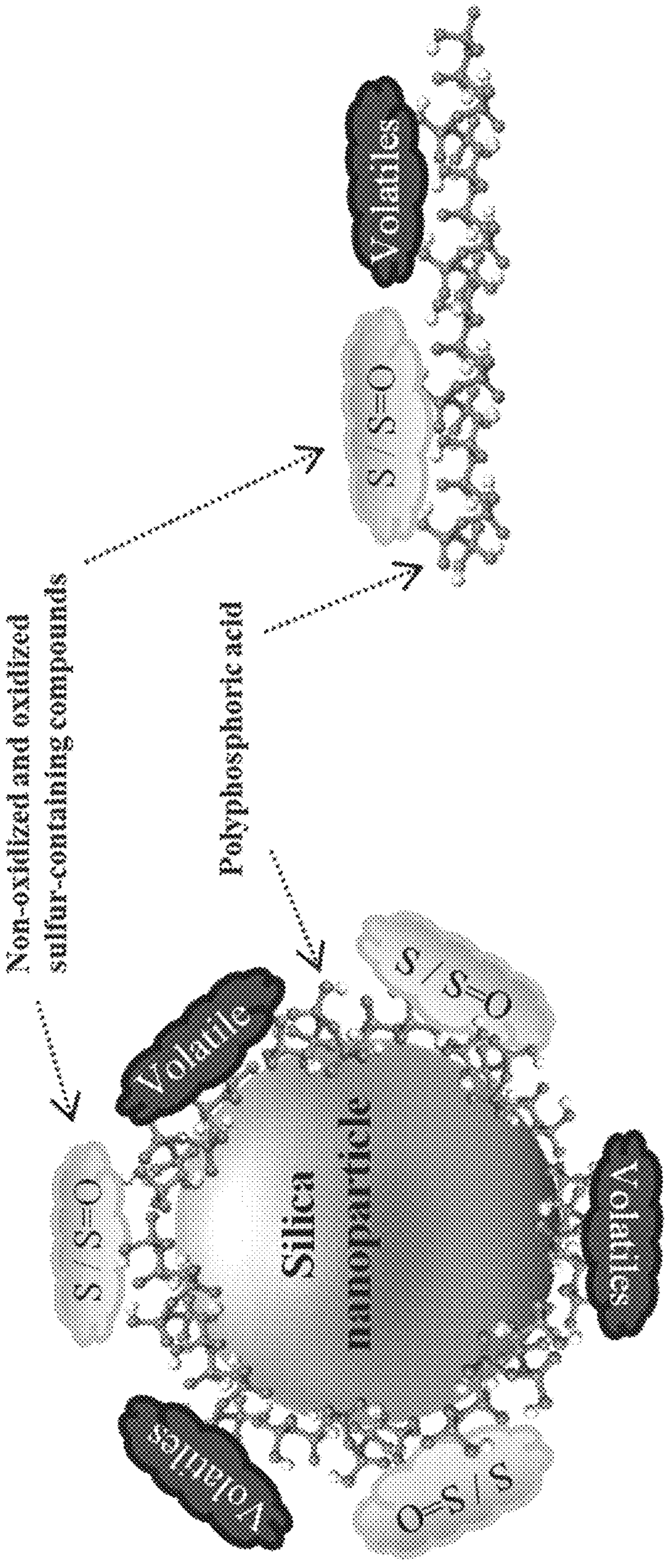
FIG. 11 depicts different intermolecular interactions of VBR components with PPA-grafted silica and PPA.

Quantum-Mechanical Calculations Based on DFT. This section shows calculations for the interactions of candidate components of VBR with both pure PPA and PPA-grafted silica. Three classes of candidate VBR molecules were considered: 1) volatile molecules whose emission from hot bitumen has been reported previously; 2) sulfur compounds; 3) oxidized sulfur compounds (sulfoxide compounds). FIG. 11 is a schematic depicting the different intermolecular interactions calculated and compared in this analysis.

Adsorption of PPA on the silica surface. PPA is an oligomer with several intramolecular hydrogen bonds in its structure. The terminal hydrogen of PPA can participate in hydrogen bonding with (or proton transfer to) the electronegative atoms of other species. The hydrogen atoms in the backbone of the PPA usually do not contribute to hydrogen bonding or acid-base interaction with heteroatoms of hydrocarbon molecules because of the intramolecular hydrogen-bond network in PPA's backbone. However, this does not rule out the role of the PPA backbone in PPA's binding to other molecules. Non-bonded interactions between the π-electrons of conjugated aromatic components of bitumen and PPA's backbone can occur.

Figure 12A:
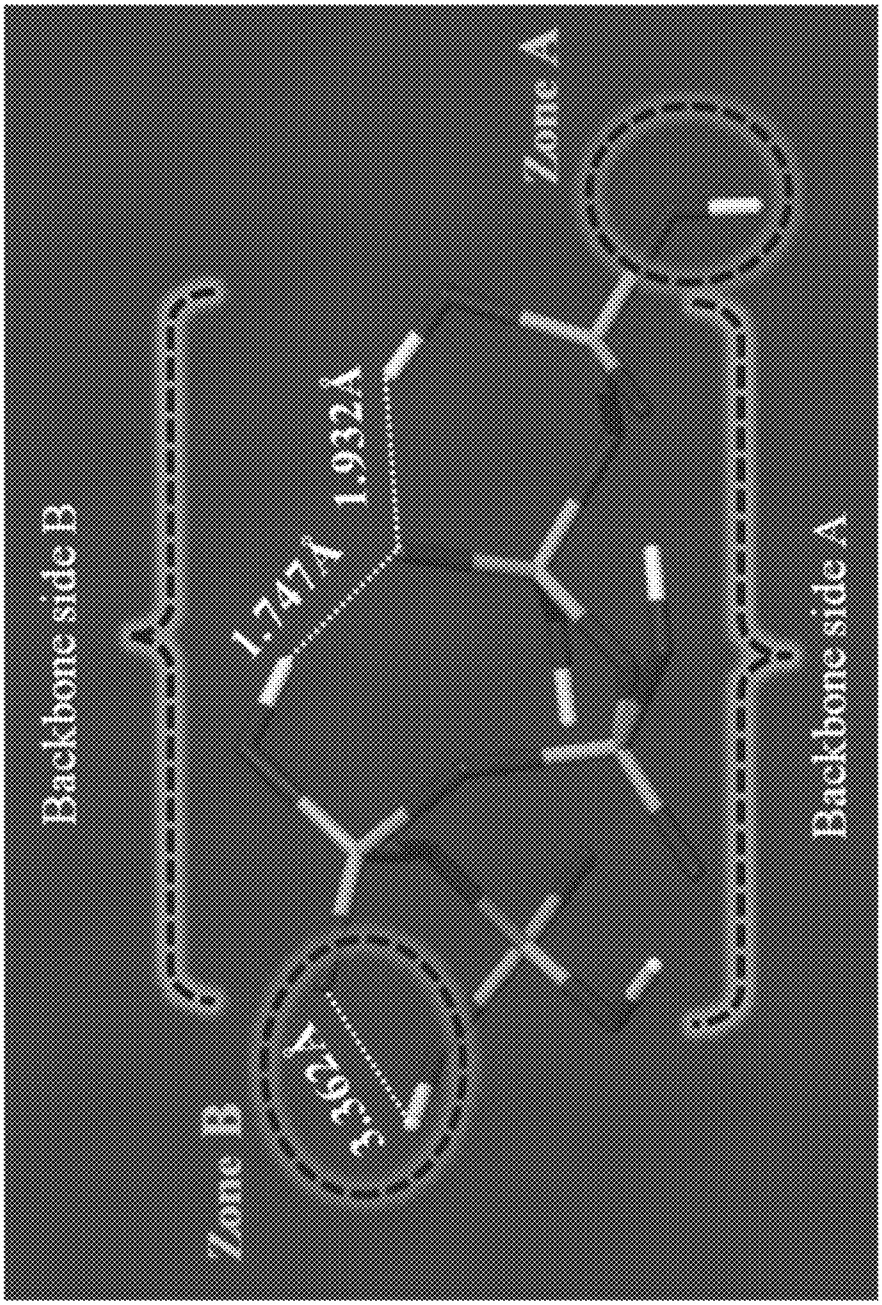
FIG. 12A depicts the optimized geometry of PPA and the different active sites that interact with VBR components.
Figure 12B:
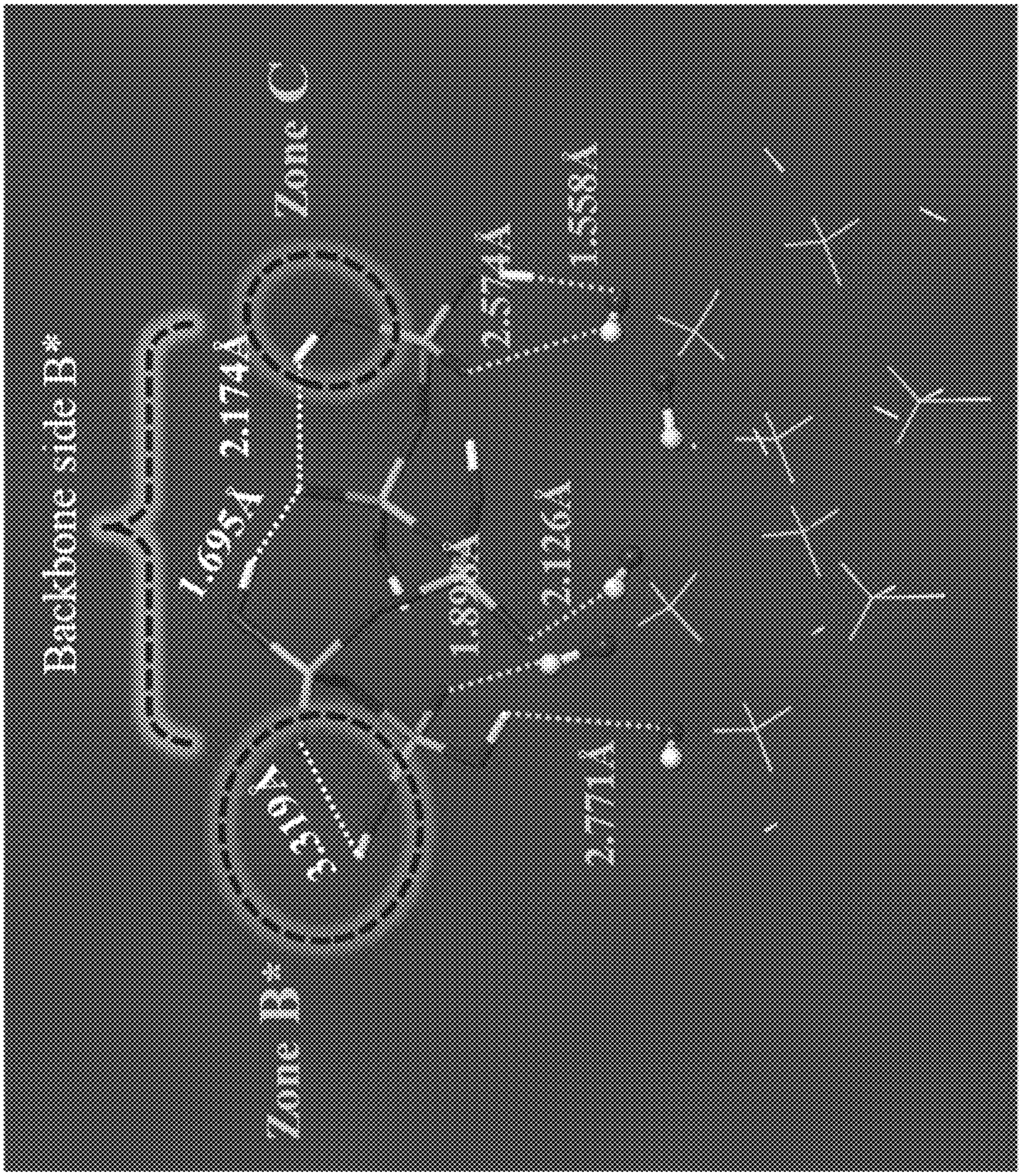
FIG. 12B depicts the optimized geometry of PPA-grafted silica, intermolecular hydrogen bonds between the PPA and silica, and different active sites that interact with VBR components.

Since PPA has polar P═O and O—H functional groups, PPA can be adsorbed on the polar surfaces of inorganic solids such as silica and clay minerals. Silica-supported PPA has been experimentally prepared and used as an activator in organic synthesis and transformation reactions. Silanol (SiOH) groups of silica surfaces are active target sites for interaction with PPA. The DFT results showed several hydrogen bonds in the forms of $PO^{\delta-}_{(PPA)} \ldots {}^{+\delta}HO_{(silica)}$ and $OH^{\delta-}_{(PPA)} \ldots {}^{-\delta OH}_{(silica)}$ between the PPA oligomer and the silica surface. Two hydrogen-bond distances were shorter than 2 Å and three were between 2-3 Å; these are shown in FIG. 12B. In addition, changes in the intramolecular hydrogen-bond network in PPA's backbone were detected after the adsorption of PPA to silica. An intramolecular hydrogen bond in the backbone side (B) of PPA was increased from 1.932 Å to 2.174 Å (backbone side (B*)), making the zone (C) available for hydrogen bonding with VBR molecules. The model described in FIG. 12B was used as PPA-grafted silica for further adsorption studies in this work. Different active sites were tested for the interaction of each VBR molecule with modifiers. The active sites considered for PPA as shown in FIG. 12A are zone (A), zone (B), backbone side (A), and backbone side (B). The active sites considered for PPA-grafted silica shown in FIG. 12B are zone (C), zone (B*), and backbone side (B*). The maximum value of binding energy for each interaction is shown in FIGS. 12A and 12B.

Interactions of candidate volatile organic molecules with PPA and PPA-grafted silica. For each candidate volatile organic molecule, Table 6 shows the binding energy and the most favorable active sites for interaction with PPA and for interaction with PPA-grafted silica. The details of each interaction are discussed below.

TABLE 6

The binding energy (kcal/mol) for candidate volatile organic molecules when interacting with pure PPA and when interacting with PPA-grafted silica

| | Interaction with PPA-grafted silica | | Interaction with PPA | |
|---|---|---|---|---|
| | $E_{bind}$ | Interaction sites | $E_{bind}$ | Interaction sites |
| 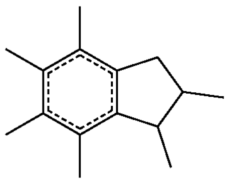<br>Benzothiophene | −27.6 | backbone side (B*) zone (C) | −13.5 | backbone side (A) zone (A) |
| 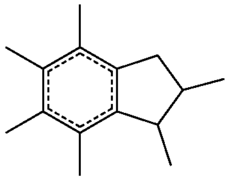<br>Benzofuran | −36.8 | backbone side (B*) zone (C) | −22.8 | backbone side (A) zone (A) |
| 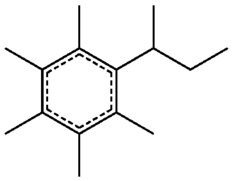<br>Benzoic acid | −46.3 | zone (B*) | −27.1 | backbone side (A) zone (A) |
| 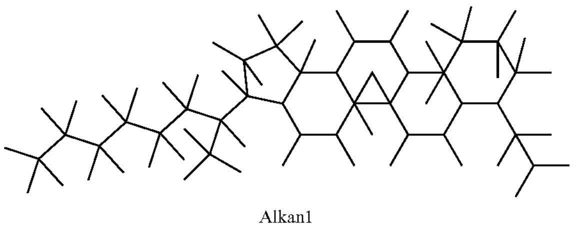<br>Alkanl | −62.5 | backbone side (B*) | −27.9 | backbone side (A) |

TABLE 6-continued

The binding energy (kcal/mol) for candidate volatile organic molecules when interacting with pure PPA and when interacting with PPA-grafted silica

| | Interaction with PPA-grafted silica | | Interaction with PPA | |
|---|---|---|---|---|
| | $E_{bind}$ | Interaction sites | $E_{bind}$ | Interaction sites |
| 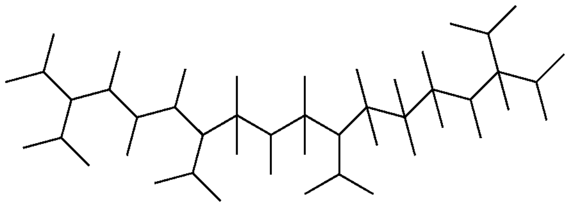 [SMILES: CC(C)C(C(C)C)C(C)C(C)C(C)C(C(C)C)C(C)(C)C(C)C(C)(C)C(C(C)C)C(C)(C)C(C)(C)C(C)(C)C(C)C(C)(C(C)C)C(C)C]<br>Alkan2 | −48.0 | backbone side (B*) | −22.7 | backbone side (A) |
| 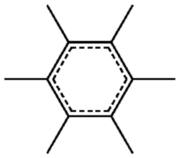<br>Benzene | −34.2 | zone (B*) | −17.3 | zone (B) |
| 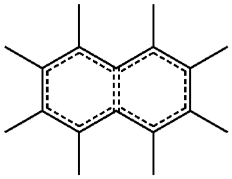<br>Naphthalene | −38.3 | zone (B*) | −24.1 | backbone side (A)<br>zone (A) |

Benzothiophene. Benzothiophene is a polycyclic aromatic sulfur hydrocarbon (PASH) with the molecular formula $C_8H_6S$ that is found in petroleum products. When burned and oxidized, the organosulphur compounds produce sulfur dioxide, which contributes to acid rain. PASHs exist as contaminants in wastewater, exhibiting toxic and mutagenic properties. Benzothiophene and dibenzothiophene molecules are emitted at high temperatures from asphalt surfaces, contributing to the formation of secondary organic aerosol (SOA), which further promotes air and environmental pollution. Benzothiophene has an affinity toward solid surfaces such as silica. It has been reported that the adsorption mechanism using pure silica gel successfully removed benzothiophene from transportation fuels.

The affinity of benzothiophene toward PPA-grafted silica and pure PPA oligomer was analyzed. The result showed that the interaction of benzothiophene with PPA-grafted silica is more than twice as stable as that of benzothiophene with PPA. In the (benzothiophene)-(PPA-grafted silica) complex (−27.6 kcal/mol), the benzothiophene molecule adsorbed to the backbone side (B*) of the PPA layer on silica; the distance of the sulfur atom of benzothiophene to the hydrogen in zone (C) was 2.408 Å. In the benzothiophene-PPA complex (−13.5 kcal/mol), benzothiophene interacted with the backbone side (A), and the distance between the sulfur atom of benzothiophene and hydrogen in zone A was 2.954 Å.

Benzofuran. Benzofuran adsorbed parallel to the backbone side (B*) of PPA-grafted silica. A hydrogen-bond distance of 2.985 Å was obtained between the oxygen atom of benzofuran and hydrogen in zone (C). In the benzofuran-PPA complex, benzofuran was oriented parallel to zone (A), and the oxygen atom of benzofuran was placed at distances of 3.203 Å and 3.359 Å from the hydrogen in zone (A) and the hydrogen in backbone side (A), respectively. The binding energy for the interaction of benzofuran with PPA-grafted silica (−36.8 kcal/mol) was higher than that for the interaction of benzofuran with PPA (−22.8 kcal/mol). For the latter interaction, a geometry in which a hydrogen bond with a distance of 1.732 Å was formed between the oxygen of benzofuran and hydrogen in zone (A) was less stable (19.3 kcal/mol); in this geometry, the electrostatic attractions between the π-electron of benzofuran and the backbone of PPA were missing.

Benzoic acid. The results showed that the binding energy for the interaction of benzoic acid with PPA-grafted silica (−46.3 kcal/mol) was notably higher than that for the interaction of benzoic acid with PPA (−27.1 kcal/mol). In the interaction of benzoic acid with PPA-grafted silica, the benzoic acid oriented vertically toward zone (B*) and formed two strong hydrogen bonds with distances of 1.518 Å ($C{=}O^{\delta-}{}_{(benzoic\ acid)} \cdots {}^{+\delta}HO_{(PPA)}$) and 1.677 Å ($OH^{\delta+}{}_{(benzoic\ acid)} \cdots {}^{-\delta}O{=}P_{(PPA)}$). In fact, the C=O and OH groups of benzoic acid bridged between the OH and PO groups in zone (B*). These hydrogen bonds had a dominant role in the stability of the complex. In the benzoic acid-PPA complex, the benzoic acid was oriented parallel to the backbone side (A), and only one hydrogen bond with a distance of 1.648 Å was formed between the two fragments at zone (A).

Alkanes. Results showed that alkane molecules with cyclic parts (Alkane1) interact better than chain alkane (Alkane2) with PPA and PPA-grafted silica. As these alkanes do not have polar heteroatoms such as oxygen or nitrogen, and the alkane C—H bonds have very low acidity, no conventional hydrogen bond was formed in these interactions. However, alkanes can participate in C(alkane)-H . . . HC, C(alkane)-H . . . π, and C(alkane)-H . . . O types of noncovalent interactions in many organic and inorganic associates. Several cyclic and acyclic alkanes have been isolated as solid organic or inorganic associates, combined via noncovalent interactions. These interactions can be used in separation, transportation, or storage of alkanes. These results showed that for both alkanes, complexes formed with PPA-grafted silica were more stable (up to 124%) than complexes formed with PPA. As mentioned, the backbone of PPA is less rigid in PPA-grafted silica compared to that in pure PPA. This can increase the number and stability of C(alkane)-H . . . HO or C(alkane)-H . . . OP interactions between alkanes and PPA-grafted silica. In addition, the increased polarizability of PPA in PPA-grafted silica increases the induced dipole in alkanes, leading to stronger and more numerous van der Waals interactions between the two fragments.

Benzene and naphthalene. Interactions of these aromatic molecules with PPA-grafted silica were more stable than their interactions with pure PPA. The definition of a conventional hydrogen bond (X—H . . . Y, where X and Y are mainly N or O atoms) can be extended to include less electronegative atoms (such as X=C, S and Y=π, S). Interactions such as OH . . . π, NH . . . π or lone pair (O) . . . π have been widely studied in macromolecular structures. Aromatic rings can act as hydrogen-bond acceptors. In addition, lone-pair-π interaction has been found in atomic resolution macromolecular structure. These results showed that both benzene and naphthalene formed more stable complexes with PPA-grafted silica (up to 98%) than with pure PPA. These stabilities are due to better π . . . OH and PO . . . π interactions (charge transfers) between the aromatic ring and PPA-grafted silica.

Interactions of sulfur compounds with PPA and with PPA-grafted silica. Table 7 shows the binding energy and the most favorable active sites for the interaction of PPA or PPA-grafted silica with each candidate sulfur molecule. The details of each interaction are discussed below. The interactions of benzothiophene with PPA-grafted silica and PPA were explained in the previous section.

TABLE 7

Binding energy (kcal/mol) for sulfur compounds interacting with pure PPA and with PPA-grafted silica

| | Interaction with PPA-grafted silica | | Interaction with PPA | |
|---|---|---|---|---|
| | $E_{bind}$ | Interaction sites | $E_{bind}$ | Interaction sites |
| 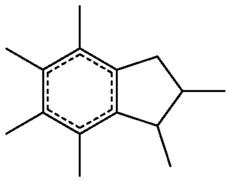 Benzothiophene | −27.6 | backbone side (B*) zone (C) | −13.5 | backbone side (A) zone (A) |
| 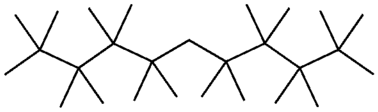 [SMILES: CC(C)(C)C(C)(C)C(C)(C)C(C)(C)CC(C)(C)C(C)(C)C(C)(C)C(C)(C)C] Dibutyl sulfide | −40.2 | backbone side (B*) zone (B*) | −16.8 | zone (B) |
| 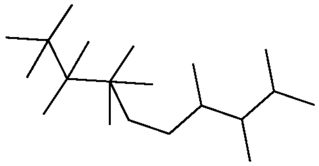 Dipropyl disulfide | −35.0 | backbone side (B*) zone (B*) | −14.2 | backbone side (B) zone (B) |
| 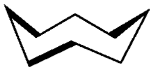 Elemental sulfur ($S_8$) | −35.7 | zone (B*) | −15.8 | backbone side (A) zone (A) |

Dibutyl sulfide. This molecule contains one sulfur atom and two butyl chains. In the interaction complex with PPA-grafted silica, the distance of the sulfur atom to the hydrogen in zone (B*) was 1.908 Å, and one of the butyl chains was located parallel to the backbone side (B*). In the adsorption complex with PPA, the distance of the sulfur atom to the hydrogen in zone (B) was 1.886 Å, and there was no interaction between any butyl chains and the backbone of PPA. This resulted in higher stability for the interaction of dibutyl sulfide with PPA-grafted silica (−40.2 kcal/mol) compared to that of dibutyl sulfide with PPA (−16.8 kcal/mol).

Dipropyl disulfide. This molecule has a sulfur-sulfur bond and two propyl chains. The orientations of dipropyl disulfide toward PPA-grafted silica and toward PPA were very similar. The distances from the sulfur atom to the hydrogen in zone (B*) and to the hydrogen in zone (B) were about 2 Å. However, the interaction with PPA resulted in shorter intramolecular hydrogen bonds in the backbone side (B). The intramolecular hydrogen bonds in backbone side (B), which were 1.747 Å and 1.932 Å in the absence of dipropyl disulfide, shortened to 1.577 Å and 1.843 Å after interaction with dipropyl disulfide, respectively; this makes the backbone of PPA more rigid, leading to lower binding between dipropyl disulfide and PPA. Conversely, the intramolecular hydrogen bond in the backbone side (B*) of PPA-grafted silica was lengthened from 2.174 Å to 2.332 Å, making the backbone of PPA more flexible for interaction with dipropyl disulfide. The binding energy for interaction of dipropyl disulfide with PPA-grafted silica (−35.0 kcal/mol) was higher than that for interaction of dipropyl disulfide with PPA (−14.2 kcal/mol).

Elemental sulfur. A cluster of eight sulfur atoms ($S_8$) was selected as a model for elemental sulfur. The optimized geometry of this cluster had crown-shaped geometry. Results showed that elemental sulfur had a higher affinity toward PPA-grafted silica (−35.7 kcal/mol) than toward PPA (−15.8 kcal/mol). Ss was adsorbed to zone (B*) in the PPA-grafted silica, with the OH and P═O groups of zone (B*) oriented toward the sulfur atoms. The interaction of $S_8$ with PPA occurred at zone (A) and backbone side (A), where all P═O groups were involved in intramolecular hydrogen bonds.

Interactions of oxidized sulfur compounds with PPA and PPA-grafted silica. Table 8 shows the binding energy and the most favorable active sites for the interaction of PPA or PPA-grafted silica with each candidate oxidized sulfur molecule. The details of each interaction are discussed below.

TABLE 8

Binding energy (kcal/mol) for sulfur compounds interacting with pure PPA and with PPA-grafted silica

| | Interaction with PPA-grafted silica | | Interaction with PPA | |
|---|---|---|---|---|
| | $E_{bind}$ | Interaction sites | $E_{bind}$ | Interaction sites |
| 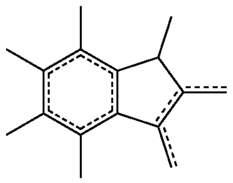 Benzothiophene sulfoxide | −36.3 | backbone side (B*) zone (C) | −25.4 | backbone side (A) zone (A) |
| 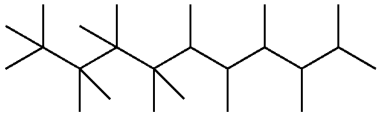 [SMILES: CC(C)C(C)C(C)C(C)C(C)C(C)(C)C(C)(C)C(C)(C)C(C)(C)C] Dibutyl sulfoxide | −40.8 | backbone side (B*) zone (B*) | −24.8 | zone (B) |
| 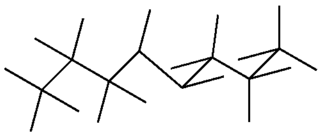 [SMILES: CC(C(C)C(C)(C)C(C)(C)C(C)(C)C)C(C)(C)C(C)(C)C(C)(C)C] Dipropyl disulfoxide | −37.4 | backbone side (B*) zone (B*) | −18.6 | backbone side (B) zone (B) |
|  Oxidized sulfur ($S_8$) | -39.4 | zone (B*) | -18.0 | backbone side (A) zone (A) |

Benzothiophene sulfoxide (also known as 1-benzothiophene 1-oxide). Benzothiophene sulfoxide, having one sulfoxide (S═O) group in its aromatic structure, could form a hydrogen bond with either PPA-grafted silica or PPA. It adsorbed to zone (B*) of PPA-grafted silica; the aromatic rings were located on top of the OH and P═O groups, and a hydrogen bond (1.463 Å) was formed. Benzothiophene sulfoxide formed a hydrogen bond with the hydrogen in zone (A) of PPA; the aromatic rings were parallel to the backbone side (A), which was rigid due to intramolecular hydrogen bonds. The binding energy for the interaction of benzothiophene sulfoxide with PPA-grafted silica (−36.3 kcal/mol) was higher than that for the interaction of benzothiophene sulfoxide with PPA (−25.4 kcal/mol).

Dibutyl sulfoxide. This molecule adsorbed to the backbone side (B*) of PPA-grafted silica, and the S═O group formed a hydrogen bond (1.334 Å) with the hydrogen atom in zone (C). Dibutyl sulfoxide interacted with the backbone side (A) of pure PPA. Interestingly, in the latter interacting complex, the S═O group of dibutyl sulfoxide disrupted an intramolecular hydrogen bond in the backbone side (A). A proton ($H^+$) transfer from hydrogen in the backbone side (A) to the S═O group was obtained. Yet, the stability of the latter interaction (−24.8 kcal/mol) was lower than that of PPA-grafted silica (−40.8 kcal/mol). Usually, a proton-transfer process is accompanied by higher interaction energy than a hydrogen-bond formation; however, this proton transfer reaction passes through an energy barrier to disrupt an intramolecular hydrogen bond in the backbone of PPA. Furthermore, the resulting ion pair was not stabilized by the resonance structures of the PPA (such as that obtained for acid-base interactions of PPA with bitumen's resin or montmorillonite clay).

Dipropyl Disulfoxide. This molecule has two S═O groups and two propyl chains in its structure. These results showed that dipropyl disulfoxide disrupted the two hydrogen bonds in the backbone side (B) of PPA and in the backbone side (B*) of PPA-grafted silica. The O═S—S═O part in dipropyl disulfoxide bridged the two OH groups in the backbone side (B) or backbone side (B*) by forming hydrogen bonds. These interactions impose partial negative charges on the oxygen atoms of the two OH groups of PPA and PPA-grafted silica. These interactions excluded a P═O group in backbone side (B) or backbone side (B*) from participating in intramolecular interactions. The partial negative charges can be stabilized better in the (dipropyl disulfoxide)-(PPA-grafted silica) complex, due to more resonance structures, compared to the dipropyl disulfoxide-PPA complex. Accordingly, the interaction of dipropyl disulfoxide with PPA-grafted silica (−37.4 kcal/mol) was more stable than that of dipropyl disulfoxide with PPA (−18.6 kcal/mol).

Oxidized sulfur ($S_8O$). The oxidized $S_8$ molecule had a higher affinity toward PPA-grafted silica ($E_{bind}$=−35.7 kcal/mol) than toward PPA ($E_{bind}$=−15.8 kcal/mol). It was adsorbed to the backbone side (B*) of PPA-grafted silica, and its S═O group formed a hydrogen bond (1.834 Å) with the hydrogen atom in zone (C). In the case of $S_8$ interaction with PPA, a hydrogen bond (1.675 Å) was formed between the S═O group and the hydrogen atom in zone (A); however, the crown-shaped ring was located parallel to the backbone side (A), which was rigid due to intramolecular hydrogen bonds in this area.

Figure 13A:
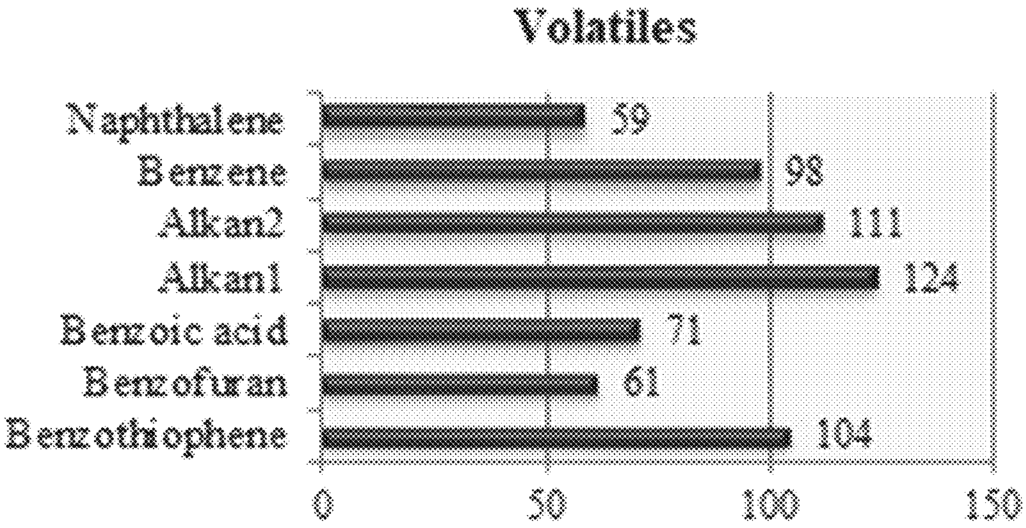
FIGS. 13A-13C show plots of the percentage increase in binding energy for the interaction of each VBR molecule when bound to PPA-grafted silica compared with PPA.
Figure 13B:
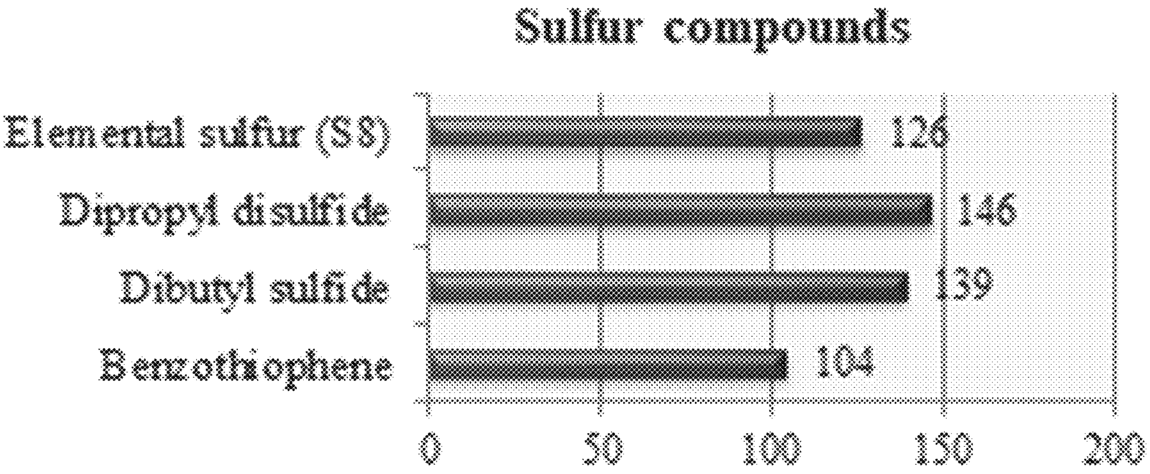
Figure 13C:
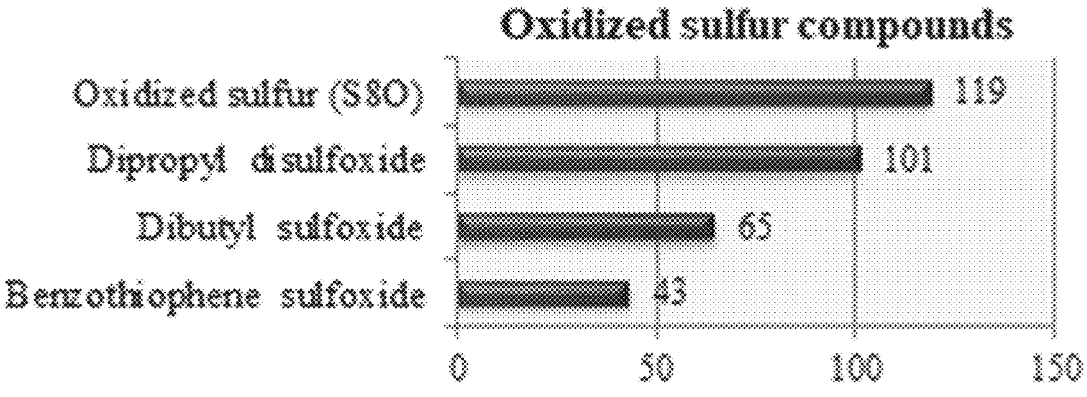

Analysis of the binding energy values. FIGS. 13A-13C show plots of the percentage increase in binding energy for the interaction of each VBR molecule when bound to PPA-grafted silica compared with PPA. In all cases, the complexes formed by PPA-grafted silica and VBR components were more stable than those formed by PPA and VBR components. The percentage increases in binding energies were 61%-124% for volatile molecules, 104%-146% for sulfur compounds, and 43%-119% for sulfoxide compounds.

Figure 14A:
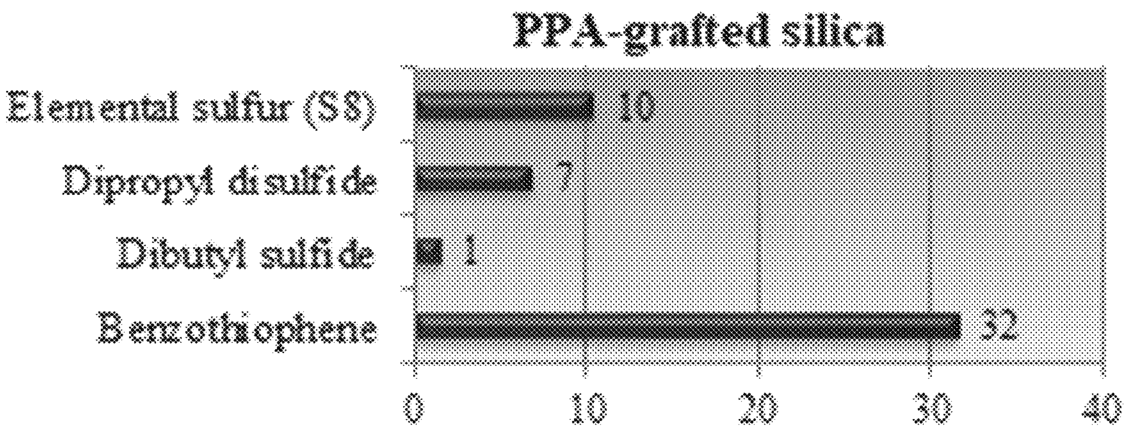
FIGS. 14A-14B show plots of the percentage increase in binding energies when each sulfur compound in VBR is oxidized to a sulfoxide compound.
Figure 14B:
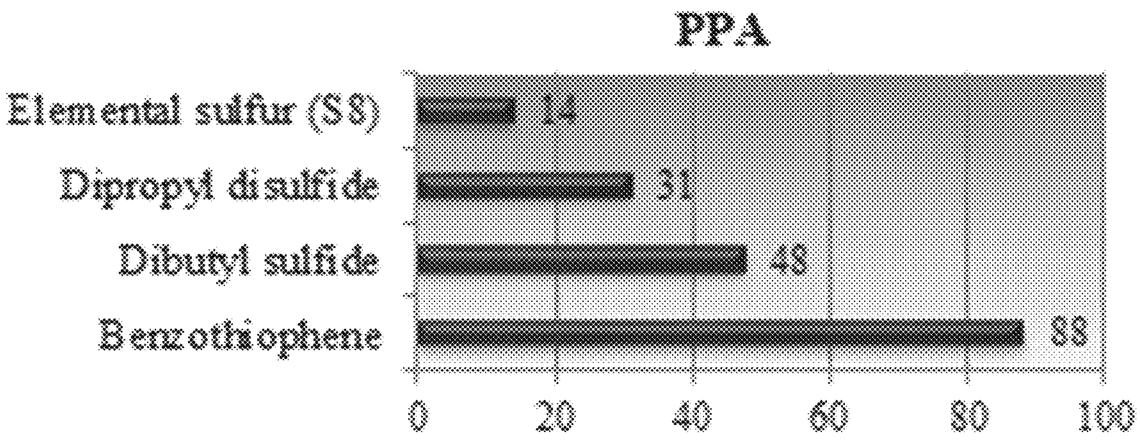

FIGS. 14A and 14B show how the oxidation of a sulfur atom to sulfoxide changes the binding energies for interactions of the sulfur compounds with PPA or with PPA-grafted silica. According to these results, after the oxidation of sulfur compounds and the formation of sulfoxide functional groups, the stability of intermolecular interactions with PPA notably increased (14%-88%). The increase in the stability of intermolecular interactions with PPA-grafted silica after oxidation of sulfur compounds was 1%-32%. This indicates that PPA-grafted silica provides highly stable complexes with both sulfur compounds and sulfoxide compounds, while PPA's efficacy is considerably increased by an increase in the sulfoxide contents of VBR.

An environmental and economic assessment showed that by introducing PPA-grafted silica to neat VBR, a plant producing regular air-blown bitumen non-stop at a rate of 100 tonne/hr could reduce the duration of air-blowing by up to 25%, with a comparable reduction in emissions of polluting gases and a daily savings in power of 2,610 kWh.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of treating a modified bitumen, the method comprising:

contacting the modified bitumen with a flow of air, wherein the modified bitumen comprises:

about 90 wt % to about 97 wt % bitumen;

about 2 wt % to about 6 wt % silica particles; and about 0.2 wt % to about 2 wt % acid component, wherein each silica particle is coupled to the acid component, and a temperature of the air is 170° C.; and removing the flow of air when a penetration grade of the bitumen is in a range between 50 and 100.

2. The method of claim 1, wherein the length of time is between 1 hour and 10 hours.

3. The method of claim 1, wherein the acid component enhances intermolecular interactions in the bitumen.

4. The method of claim 1, wherein the modified bitumen further comprises additives comprising 3-aminopropyl triethoxysilane (APTES), 3-glycidyloxypropyl trimethoxysilane, or a combination thereof.

5. The method of claim 1, wherein the acid component comprises polyphosphoric acid.

6. The method of claim 1, wherein the multiplicity of silica particles are nanoparticles.

7. The method of claim 6, wherein the nanoparticles have a diameter in a range of about 20 nm to about 30 nm.

8. The method of claim 1, wherein the length of time to achieve a penetration grade value between 50 and 100 is shorter for the modified bitumen than for the bitumen.

* * * * *